US010919151B1

(12) United States Patent
Marchese et al.

(10) Patent No.: US 10,919,151 B1
(45) Date of Patent: *Feb. 16, 2021

(54) ROBOTIC DEVICE CONTROL OPTIMIZATION USING SPRING LATTICE DEFORMATION MODEL

(71) Applicant: Amazon Technologies, Inc., Seattle, WA (US)

(72) Inventors: Andrew D. Marchese, Concord, MA (US); William Clay Flannigan, Cambridge, MA (US); Parris S. Wellman, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 347 days.

This patent is subject to a terminal disclaimer.

(21) Appl. No.: 15/934,568

(22) Filed: Mar. 23, 2018

(51) Int. Cl.
*B25J 9/16* (2006.01)
*B65G 1/137* (2006.01)
(Continued)

(52) U.S. Cl.
CPC ............ *B25J 9/163* (2013.01); *B25J 9/1612* (2013.01); *B25J 15/0616* (2013.01); *B25J 19/023* (2013.01); *B65G 1/1373* (2013.01)

(58) Field of Classification Search
CPC ...... B25J 9/163; B25J 9/1612; B25J 15/0616; B25J 19/023; B25J 9/1692; B25J 9/1661; B25J 9/1666; B25J 13/085; E21B 10/43; H01L 21/67196; H01L 51/001; B65G 1/1373; G06N 20/00; H04W 4/70; C23C 14/04; C23C 14/24; C23C 14/243; G01V 1/48; G01V 1/52; G06F 11/0709; G06F 11/079; G06F 11/1004; G06F 11/183; G06F 11/302; G06F 11/327; G06F 16/148; G06F 16/156; G06F 16/164; G06F 16/182;
(Continued)

(56) References Cited

U.S. PATENT DOCUMENTS 7,313,464 B1 * 12/2007 Perreault ................. B25J 9/1666
318/568.1
8,060,252 B2 * 11/2011 Gage ................... H01L 21/67196
118/715
(Continued)

OTHER PUBLICATIONS

Lansfield et al., Integration of Planning and Deformation Model Estimation for Robotic Cleaning of Elastically Deformable Objects, 2017, IEEE, p. 352-359 (Year: 2017).*
(Continued)

*Primary Examiner* — McDieunel Marc
(74) *Attorney, Agent, or Firm* — Patterson + Sheridan, LLP

(57) ABSTRACT

Method and apparatus for training a machine learning model for controlling a robotic picking device having a suction device end effector. A robotic control operation and a candidate contact point for holding a first item using a suction device of a robotic picking arm are determined, by processing information describing the first item as an input to a machine learning model. A seal quality metric is estimated for the candidate contact point, based on a predicted deformed n-dimensional shape of the suction device and a n-dimensional shape associated with the first item. One or more weights within the machine learning model are refined based on the estimated seal quality metric.

20 Claims, 12 Drawing Sheets

(51) Int. Cl.
  *B25J 19/02* (2006.01)
  *B25J 15/06* (2006.01)
(58) Field of Classification Search
  CPC .. G06F 19/3418; G06F 1/1609; G06F 1/1626; G06F 1/1641; G06F 1/1643; G06F 1/1652; G06F 1/1656; G06F 21/602; G06F 21/6245; G06F 2201/865; G06F 2203/04105; G06F 2209/481; G06F 3/0412; G06F 3/0446; G06F 9/4843; G06F 9/485; G06F 9/4881; G06F 9/5011; G06F 9/5027; G06F 9/5077; G06F 9/542
  See application file for complete search history.

(56) References Cited

U.S. PATENT DOCUMENTS

| | | | |
|---|---|---|---|
| 8,180,487 B1* | 5/2012 | Vangal-Ramamurthy | B25J 9/1692 219/121.78 |
| 8,355,815 B2* | 1/2013 | Luce | E21B 10/43 700/245 |
| 9,333,649 B1 | 5/2016 | Bradski et al. | |
| 9,669,543 B1* | 6/2017 | Stubbs | B25J 9/1612 |
| 2019/0291282 A1* | 9/2019 | Marchese | B25J 9/1661 |
| 2019/0361672 A1* | 11/2019 | Odhner | B25J 13/085 |

OTHER PUBLICATIONS

Hesseiroth et al., Neural network control of a pneumatic robot arm, 1994, IEEE, p. 28-38 (Year: 1994).*
Joumee et al., An investigation into improved non-contact adhesion mechanism suitable for wall climbing robotic applications, 2011, IEEE, p. 4915-4920 (Year: 2011).*
Hashimoto et al., Development of a multi-fingered robot hand with fingertip tactile sensors, 1993, IEEE, p. 875-882 (Year: 1993).*
Notification of Transmittal of the International Search Report and the Written Opinion of the International Searching Authority, or the Declaration for Application No. PCT/US2019/023458 dated Jul. 5, 2019.
Zeng et al., "Robotic Pick-and-Place of Novel Objects in Clutter with Multi-Affordance Grasping and Cross-Domain Image Matching," Oct. 3, 2017, Cornell University Library, 201 Olin Library Cornell University, 10 pages.
Jeffrey Mahler et al: "Dex-Net 3.0: Computing Robust Robot Vacuum Suction Grasp Targets in Point Clouds using a New Analytic Model and Deep Learning", arxiv.org, Cornell University Library, 201 Olin Library Cornell University, Sep. 19, 2017, 16 pages.
Causo Albert et al: "Visual marker-guided mobile robot solution for automated item picking in a warehouse", 2017 IEEE International Conference on Advanced Intelligent Mechatronics (AIM), IEEE, Jul. 3, 2017, 6 pages.
U.S. Appl. No. 15/934,498, "Optimization-Based Spring Lattice Deformation Model for Soft Materials", filed Mar. 23, 2018.

* cited by examiner

ROBOTIC DEVICE CONTROL OPTIMIZATION USING SPRING LATTICE DEFORMATION MODEL

BACKGROUND

The present description relates to robotic systems and, more specifically, to techniques for training and refining a machine learning model for adaptively controlling industrial robotic systems through the use of a suction cup model.

Modern inventory systems, such as those in mail-order warehouses, supply chain distribution centers, and custom-order manufacturing facilities, face significant challenges in responding to requests for inventory items. As inventory systems grow, the challenges of simultaneously completing many packing, storing, and other inventory-related tasks become non-trivial. For instance, in product distribution centers (e.g., fulfillment centers), vast quantities of products are processed for shipment to consumers traditionally using manual labor and/or mechanical handling equipment.

Even in highly automated product distribution environments, an employee may be required to manually place a product onto a machine for automated packaging. While it can be advantageous to replace certain manual operations with an automated system (e.g., particular highly repetitive operations which can result in a repetitive use injury to the employee over a period of time), in many situations it is critical that any such automated system operate at a very high rate of success. For example, a robotic arm that retrieves an item from a bin and places the item on a conveyer belt may be unacceptable for use in a product distribution center, if the robotic arm has a high rate of failing to retrieve the item or a significant likelihood of dropping the item on the way to the conveyer belt, as such failures could significantly delay the workflow of the distribution center.

DETAILED DESCRIPTION

Figure 1:
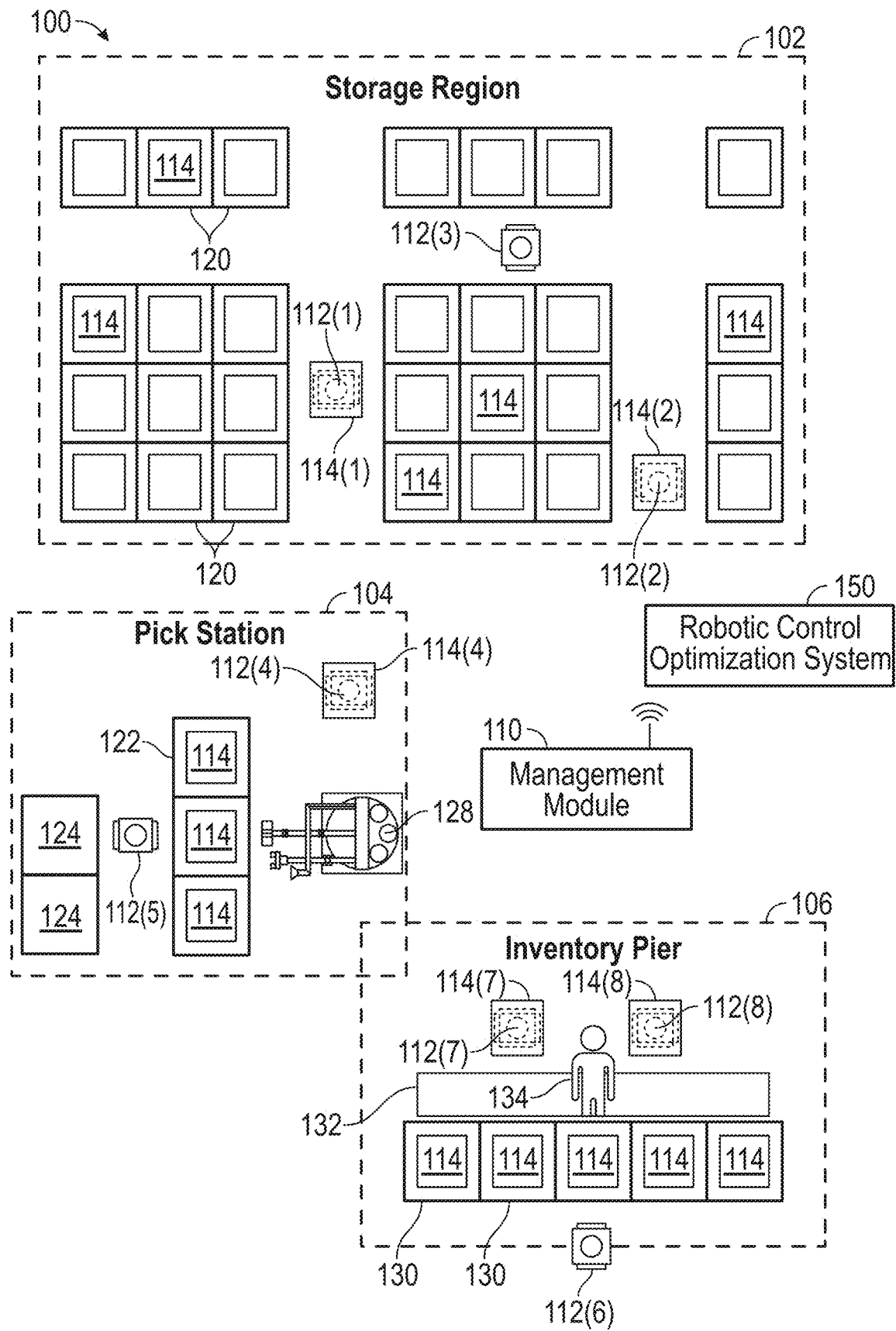
FIG. 1 illustrates an inventory system having multiple regions and mobile drive units that carry inventory holders about the regions, according to one embodiment described herein.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems according to one embodiment described herein utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a pick station for performing inventory operations. The station may include a human operator and/or automated equipment to remove desired inventory items from the inventory holders and complete orders. In some operations, the items are removed from inventory holders and placed on order holders, which too can be maneuvered by the mobile drive units. Throughout this document, reference is made to inventory holders as the racks that are moved about by the mobile drive units. It is noted that inventory holders is used in the general sense as structures that hold inventory items, items that are part of an order, packaging elements for the orders, and essentially any other item or element that might be used by the inventory and fulfillment system. As such, inventory holders may also be referred to as holders, order holders, container holders, bins, and so forth.

Mobile drive units may move about the warehouse and/or retrieve inventory holders in response to commands and/or instructions received from an automated guidance system. For example, the mobile drive units could continuously move the inventory holders into and out from the pick stations to place the appropriate items near the pickers at the right time. ("Pickers" are the human or autonomous operators that retrieve items from the inventory holders.)

Increasingly, automated systems are being used to replace highly repetitive manual operations traditionally performed by employees and which can cause harm (e.g., repetitive use injuries) to the employees over time. However, such automation is particularly challenging to implement in a product distribution center, which frequently process products of dramatically different shapes and sizes. As such, while a robotic tool can be trained to reliably perform a particular action for a particular size and shape of object relatively easily, it is significantly more challenging to implement a robotic tool that can reliably perform the particular action for objects of various shapes and sizes. For example, depending on an object's shape and size, factors such as how to pick-up the object (e.g., with a single suction device, with multiple suction devices, with a robotic claw that grasps the object, etc.), where to pick-up the object (e.g., in the middle of a dense, flat surface with a suction device, as opposed to on a non-rigid surface through which air can easily pass), and so on. As a result, training an automated system to operate in such an environment can be a very difficult task.

Generally, robotic picking devices may be configured with several different end effectors for use in performing picking operations, and may be configured with control logic that is capable of using each end effector in multiple different ways when attempting to pick up an item. For example, a robotic picking arm could be configured with a suction device end effector, and the control logic for the robotic picking arm could determine a plurality of different candidate contact points that are available on a particular item to be picked up using the suction device end effector. The control logic could then select one of the candidate contact points and could attempt to lift the item by creating a suction seal with the item using the suction device end effector. In the event that the picking operation fails (e.g., the robotic picking arm fails to lift the item, the robotic picking arm drops the item en route to the item's destination, etc.), the control logic could then select a different candidate contact point and attempt to lift the item again using the suction device end effector. The control logic could also change other parameters, such as the speed at which the robotic picking arm moves once the item has been lifted using the suction device end effector, and can even attempt to lift the item using other end effectors (e.g., a robotic claw that grasps the item).

While such a process may eventually produce a successful result (i.e., the robotic picking arm may eventually lift the item and transport the item to its intended destination), such an iterative process can consume a significant amount of time and in rare instances may damage the item (e.g., if a fragile item is dropped during transit). As many fulfillment centers operate at a rapid pace, the delays introduced by repeatedly attempting to pick up an item using different contact points and different end effectors can be problematic.

One manner of determining how to optimally control such a robotic picking arm is through the use of machine learning techniques. However, one challenge associated with machine learning is that it can be difficult to obtain an adequately large and diverse data set to accurately train such a machine learning model. For example, while it may be desirable to have a number of positive training samples (e.g., where the picking operation completed successfully) and negative training samples (e.g., where the suction device end effector failed to pick up the item or where the suction device end effector dropped the item in transit to the item's destination), in practice it is much more desirable to produce positive training samples within a fulfillment center, as any negative training samples may introduce delay into the fulfillment center's workflow and may potentially damage the items being processed. Additionally, while fulfillment centers may operate with an incredibly diverse product library, in practice some product are processed much more commonly than other products. As a result, the training data set that can be collected within a real-world environment may not be representative of the full product catalog, and thus any machine learning model trained with such data may perform relatively better on commonly processed products and relatively worse on rarely processed products within the fulfillment center.

Moreover, due to the desire to avoid failed picking attempts within a fulfillment center environment, the control logic for the robotic picking arm may operate in a relatively conservative fashion. Put another way, experimentation in how the control logic manipulates the behavior of the robotic picking arm within a fulfillment center may be undesirable, as such experimentation can result in more failed picking attempts. As a consequence, however, the control logic may not discover an optimal way of manipulating the robotic arm and the suction device end effector to retrieve certain products. Furthermore, while it is possible to manually generate training samples for rarely ordered products and to test alternate behaviors for the robotic picking arm within a test environment, such manual generation is inefficient and, for highly diverse product libraries, it is impractical to attempt to manually generate a substantial number of positive and negative training samples for each and every product within the product library.

As such, embodiments provide techniques for training a machine learning model for controlling a robotic picking arm with a suction device end effector, using data collected from simulated picking attempts. For example, embodiments could determine, by processing a first set of inputs using a machine learning model for determining behavior of a robotic arm, a first behavior for retrieving an item from within a storage container by holding the item at a contact point using a suction device of the robotic arm. Embodiments can then estimate a likelihood of successfully retrieving the item using the determined first behavior, by determining an expected seal quality metric for the contact point, by processing a three-dimensional surface model of the item and physical properties of the suction device of the robotic picking arm. Of note, while some embodiments are described herein with reference to three-dimensional models, such examples are provided for illustrative purposes only and without limitation. More generally n-dimensional models (e.g., where n is greater than 2) can be used, consistent with the functionality described herein.

For example, the seal quality metric could be expressed as a value within a defined range of seal quality metrics, with one end of the defined range representing no seal being applied and the other end of the range representing the strongest seal that can be applied by a given suction device. As another example, the seal quality metric could be an estimated measure of upwards force that is applied to the item as a result of the seal. As yet another example, the seal quality metric could be a binary value indicating whether a given item is pickable or not, e.g., based on both attributes of the item (e.g., the item's mass), attributes of the suction device end effector (e.g., a strength of a vacuum pump) and attributes of the seal between the item and the suction device end effector. Of course, such examples are provided for illustrative purposes only and more generally, any metric relating to seal quality can be used, consistent with the functionality described herein.

In calculating the estimate, embodiments could model deformation and contact between the suction device and the contact point on the item, using at least one three-dimensional spring-lattice to model deformation and contact between the suction device and the contact point on the item, such that potential energy across the three-dimensional spring-lattice is minimized. Additionally, embodiments could calculate the expected seal quality metric, using the three-dimensional spring-lattice and a fluids model relating fluid force and leak pathways. Embodiments can then train the machine learning model to optimize the behavior of the robotic arm, based on the expected seal quality metric.

FIG. 1 illustrates an inventory system having multiple regions and mobile drive units that carry inventory holders about the regions. The inventory system 100 may be arranged in a facility or warehouse (e.g., distribution facility, fulfillment center, etc.) that is logically organized into areas or regions associated with various functions. In the illustrated example, the warehouse includes a storage region 102, a pick station 104, and an inventory pier 106. In practice, depending upon the size of the inventory system 100, the warehouse may hold more than one of the storage regions 102, pick stations 104, and inventory piers 106, or the warehouse may be configured without the storage region 102, or the pick station 104, or the inventory pier 106.

The inventory system 100 includes a management module 110, multiple mobile drive units 112, inventory holders 114 and a training system 150. Only some of the inventory holders 114 are shown referenced with the number 114 for ease of illustration. The mobile drive units 112 are independent, self-powered robotic devices that may move freely about the warehouse, under their own direction or through coordination by the management module 110. The mobile drive units 112 may be used at various times to transport the inventory holders 114 around the warehouse among the regions. For instance, the mobile drive units 112 may transport the inventory holders 114 between the storage region 102 and the pick station 104 or inventory pier 106.

Each inventory holder 114 may be implemented as a physical structure to hold various inventory items. The inventory holder 114 has a physical length, width, and height that may be standardized or varied within the inventory system. As used herein, the inventory holders 114 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on. Furthermore, as used herein, inventory holders also include holders for other types of products or items and hence include order holders.

In one implementation, the inventory holder 114 may be formed as a rack having multiple shelves to support various types of inventory items. For instance, the inventory holders 114 may include multiple storage bins with each storage bin capable of holding a different type of inventory item. The inventory holders 114 are capable of being carried, rolled, or otherwise moved by the mobile drive units 112. Each inventory holder 114 may have a plurality of faces, and each bin may be accessible through specific faces. The rack is free-standing when at rest, but can be lifted and moved by the mobile drive units 112. The mobile drive units 112 may be configured to rotate inventory holders 114 at appropriate times to present particular faces of inventory holders 114 and the associated bins to an operator or other components of inventory system 10. One example is described below in more detail with reference to FIG. 2.

One or more mobile drive units 112 are provided in the storage region 102 to shuffle inventory holders 114 among the storage locations 120 and to transport the inventory holders between the storage region and other regions in the warehouse. Two loaded drive units 112(1) and 112(2) are shown in the storage area 102 carrying associated inventory holders 114(1) and 114(2), respectively, down aisles between the sets of predefined storage locations 120. An unloaded drive unit 112(3) is also shown moving through an aisle between the predefined storage locations 120.

The pick station region 104 is designed with multiple locations 122 and 124 to accommodate associated resting inventory holder 114. In FIG. 1, the pick station 104 has five locations arranged in two linear rows. A first line of three pick locations 122 is mapped next to a picking area in which a robotic picking arm 128 picks inventory from the inventory holders 114 at the pick locations 122 and loads them into boxes or containers supported by another inventory holder 114(4) mounted on a mobile drive unit 112(4). In one embodiment, the robotic picking arm 128 can be configured with one or more suction device end effectors for use in picking up items from the inventory holders 114. A second line of two staging locations 124 is mapped adjacent to, but spaced from, the first line of pick locations 122. The staging locations 124 temporarily hold inventory holders 114 on the way to and from the pick locations 122 of the pick station 104. It is noted that five locations are merely representative, and that pick stations 104 may be designed with more or fewer than five locations.

Order holders may, for example, be racks of shelving that are configured to hold boxes or containers that will be used to fill orders for inventory items. Each box or container may be associated with a particular order. For instance, an order holder may store a cardboard box that is to be used for shipping an order for several ink cartridges and several reams of paper. Order holders with orders needing such items may visit positions along the inventory pier corresponding to inventory holders storing inventory items needed by the orders. Operators may remove items from the inventory holders and place them into appropriate boxes or containers in the order holder. If necessary, the order holder may then be taken to an inventory station to fill items remaining on the orders in the boxes or containers of the order holder.

To illustrate, in the office supply example discussed above, paper may be a high volume inventory item and ink cartridges may be a highly popular item. Accordingly, a pallet of paper and an inventory holder storing various ink cartridges may be stationed at the inventory pier. An order for several packages of paper and an ink cartridge may be filled by moving an order holder a location along the inventory pier opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the inventory pier, a mobile drive unit may transport the order holder to an inventory station, where another mobile drive unit may transport an inventory holder containing the printer so that the order can be filled.

In FIG. 1, the inventory pier 106 is shown with multiple designated pier locations 130 to accommodate the inventory holders 114. Five pier locations 130 are illustrated to accommodate five corresponding holders 114, although there may be more or fewer pier locations per inventory pier 106. One mobile drive unit 112(6) is shown at the inventory pier 106 to shuffle inventory holders 114 among the locations 130 according to the techniques described herein. Two loaded mobile drive units 112(7) and 112(8) are shown at rest next to a pier 132 and holding associated inventory holders 114(7) and 114(8) (or more specifically in this case, order holders) for access by a picker 134 (again, represented as a human although a mechanical device may be used). In this example, the inventory holders 114(7) and 114(7) may be holding packages or containers for order fulfillment, where the picker 134 removes selected items from the inventory holders 114 positioned in locations 130 and loads the items into order containers on the inventory holders 114(7) and 114(8).

In some implementations, multiple mobile drive units may be used to bring inventory holders to and from the pier locations 130 of the inventory pier 106. Incoming inventory holders may be placed in temporary locations while a single mobile drive unit, such as unit 112(6), removes an existing inventory holder that has been recently picked by the picker 134 from a pier location 130 and replaces it with a new inventory holder with new items of interest for the picker 134.

In one implementation, the management module 110 orchestrates movement of the mobile drive units 112, directing them to various regions within the warehouse. The management module 110 coordinates transport of the various inventory holders among the regions in the warehouse. Furthermore, the management module 110 may be used to instruct the mobile drive units to perform the shuffle processes within a particular region (e.g., storage region 102, pick station 104, inventory pier 106, etc.). Generally, the shuffle process involves directing a mobile drive unit 112 to reposition a first inventory holder from its current location within the region to a temporary location within the region that is adjacent or proximal to the current location. The mobile drive unit 112 leaves the first inventory holder in the temporary location and subsequently positions a second inventory holder into the location vacated by the first inventory holder. The mobile drive unit 112 then lifts the first inventory unit to transport the first inventory holder away.

The management module 110 may use any form of communication to direct the mobile drive units. In one implementation, the management module 110 and the mobile drive units are configured to communicate using wireless technologies, such as a wireless local area network (WLAN). As one example, some embodiments of mobile drive unit 112 may communicate with management module 110 and/or with one another using Wi-Fi (IEEE 802.11), Bluetooth (IEEE 802.15), Infrared Data Association standards, or any other appropriate wireless communication protocol. As another example, in a tracked inventory system 100, tracks or other guidance element upon which mobile drive units 112 move may be wired to facilitate communication between mobile drive units 112 and the management module 110 and/or other components of inventory system 100.

In addition to directing the mobile drive units, the management module 110 may receive and/or generate requests to initiate any of a number of particular operations involving the mobile drive units 112, inventory holders 114, or other elements of inventory system 100. The management module 110 may select components of inventory system 100 to perform various operations and communicate commands, instructions, and/or other appropriate information to the selected components to facilitate completion of these operations. The management module 110 may receive orders for various inventory items and coordinate and administer various appropriate tasks to fill the orders. For example, an order may specify particular inventory items that have been purchased by a customer and that are to be retrieved from inventory system 10 for shipment to the customer. The management module 110 may receive the orders from any appropriate system and generates task assignments based, in part, on the orders including requests for inventory items. Based on the orders, the management module 110 may identify particular operations to be completed involving inventory items stored or to be stored within inventory system 100.

After generating one or more task assignments, the management module 110 selects appropriate components to complete particular tasks and transmits task assignments to selected components, such as the mobile drive units, to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 112, inventory holders 114, or other components of inventory system 100. Depending on the component and the task to be completed, a particular task assignment may identify locations, components, and/or actions associated with the corresponding task and/or any other appropriate information to be used by the relevant component in completing the assigned task. In one embodiment, the management module 110 is configured to control one or more robotic picking arms (e.g., at pick station 104) that retrieve specific items from a first location and place these items at a destination location.

In one embodiment, the robotic control optimization system 150 can capture one or more images of an item within a storage container to be retrieved using a robotic picking arm having a suction device. The robotic control optimization system 150 could then retrieve a three-dimensional surface model of the item, based on a unique identifier corresponding to the item. The robotic control optimization system 150 could determine a plurality of candidate contact points for holding the item using the suction device of the robotic picking arm, based on the captured one or more images of the item and the three-dimensional surface model of the item. For example, the robotic control optimization system 150 could determine a set of candidate contact points for the item and could determine which of those candidate contact points are currently accessible based on the item's pose and location within the storage container.

The robotic control optimization system 150 can determine an expected seal quality metric for a first one of the candidate contact points, by processing the three-dimensional surface model of the item and physical properties of the suction device of the robotic picking arm. For example, the robotic control optimization system 150 could model deformation and contact between the suction device and the first candidate contact point, using at least one three-dimensional spring-lattice to model deformation and contact between the suction device and the first candidate contact point on the item, such that potential energy across the three-dimensional spring-lattice is minimized. The robotic control optimization system 150 could then calculate the expected seal quality metric, using the three-dimensional spring-lattice and a fluids model relating fluid force and leak pathways. Once the expected seal quality metric is calculated, the robotic control optimization system 150 could determine, based on the expected seal quality metric, whether to retrieve the item from the storage container by holding the item at the first candidate contact point using the suction device of the robotic picking arm.

Figure 2:
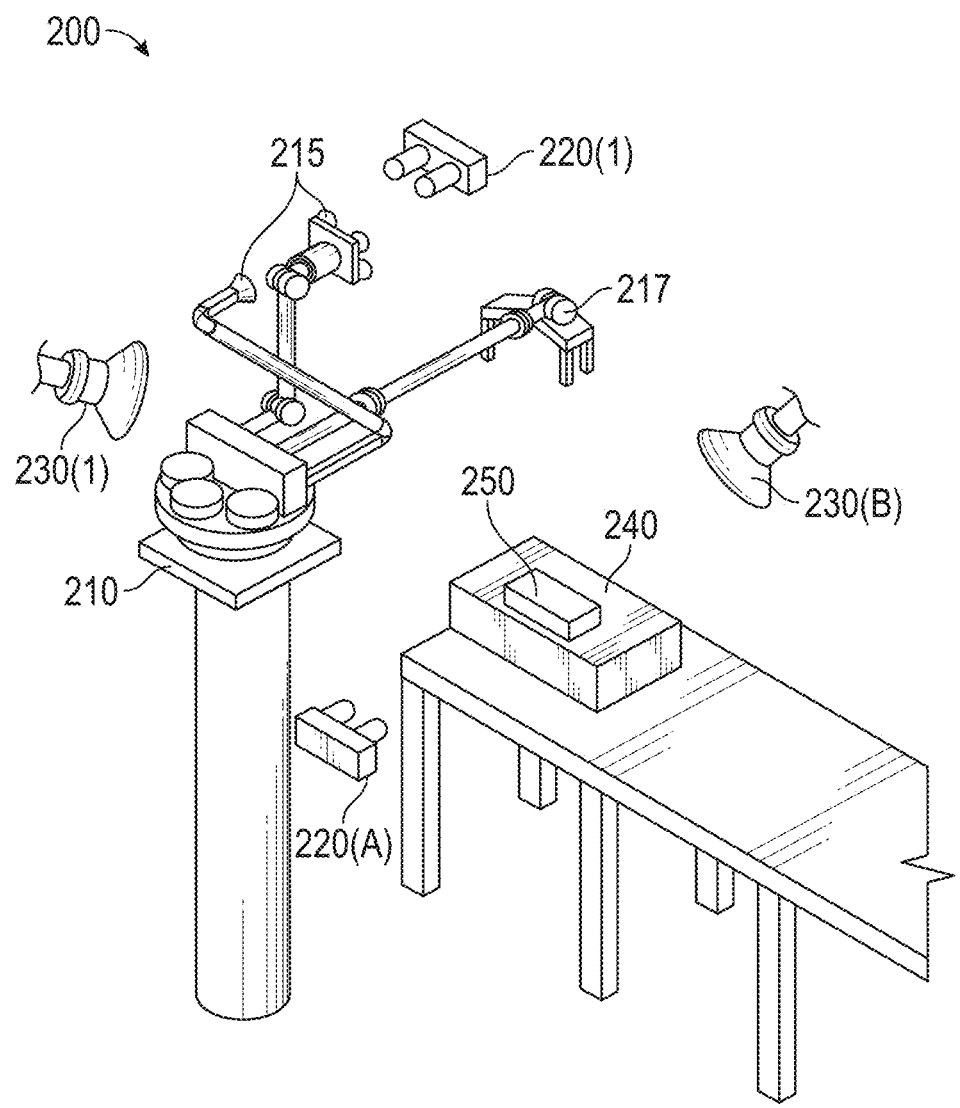
FIG. 2 illustrates a robotic picking environment within a fulfillment center, according to one embodiment described herein.

FIG. 2 illustrates a robotic picking environment within a fulfillment center, according to one embodiment described herein. As shown, the environment 200 includes a robotic picking arm 210, stereo camera devices 220(1)-(A), light sources 230(1)-(B), and an item tote 240 that contains an item 250. The stereo camera devices 220(1)-(A) generally represent camera devices that are oriented so as to capture digital images of the item 250. These images can be used, for example, to validate that the item 250 is of the expected type and is actually present within the item tote 240, to determine where within the item tote 240 the item 250 is located, to determine the orientation of the item 250 within the item tote 240, and so on. Such information could then be used to control the robotic picking arm 210, so as to retrieve the item from the item tote 250 and to carry the item to a specified destination. In one embodiment the stereo camera devices 220(1)-(A) operate in the visible light spectrum. The light sources 230(1)-(B) are positioned so as to illuminate the item 250 within the item tote 240, in order to ensure the item 250 is clearly visible within the digital images captured by the stereo camera devices 220(1)-(A).

The robotic picking arm 210 is configured with a plurality of suction end effectors 215 and a robotic claw end effector 217. For example, as shown, the plurality of suction end effectors 215 include a single suction device and a multi-head suction device. Generally, control logic for the robotic picking arm 210 can switch between the suction end effectors 215 and the robotic claw end effector 217, depending on the type of the item 250. For example, while the robotic claw mechanism may be ideal for retrieving some types of items, other items may be too small or too large for retrieval using such a mechanism. As another example, while the suction devices may be ideal for retrieving some items (e.g., a lightweight item with a substantially impermeable surface), but other items may be difficult to reliably retrieve using such a mechanism (e.g., a heavier item with a highly permeable surface). As such, the control logic for robotic picking arm 210 can be configured to select an optimal end effector to retrieve the item 250, based on attributes of the item 250.

Although not shown, the environment 200 can be configured a plurality of sensor devices that can collect data on the proximate physical environment (e.g., measures of temperature, humidity, etc.) and the robotic picking arm 210 itself (e.g., measures of vibration, measures of temperature, etc.). Control logic for the robotic picking arm 210 could capture one or more images of the item 250 using the stereo camera devices 220(1)-(A). The control logic could then analyze these images to, e.g., verify that the item 250 is located within the item tote 240, identify a placement of the item 250 within the item tote 240, determine an orientation of the item 250 within the item tote 240, and so on. The control logic could then use such information to select an optimal picking mechanism 215 and to control the movement of the robotic picking arm 210 to retrieve the item 250.

Of note, while FIG. 2 illustrates an embodiment configured to capture images of an item being manipulated with the robotic picking arm 210 using stereo camera devices 220(1)-(N), more generally data on the appearance of the item can be captured using any number of different techniques and devices. For example, while in the depicted embodiment the stereo camera devices 220(1)-(N) could be used by a three-dimensional vision system to capture images of the item, in other embodiments time-of-flight cameras (e.g., cameras that measure the time-of-flight of a light signal between the camera and a surface of the item) could be used to generate data describing the physical appearance of the item. In various other embodiments, a Light Detection and Ranging (LIDAR) system, a structured lighting system (e.g., in conjunction with stereo cameras and a three-dimensional vision system), ultrasound arrays, x-ray imaging systems, millimeter wave scanners, and so on could be used to generate a three-dimensional model of the item (e.g., for determining the item's position and pose, for use in controlling movement of the robotic picking arm 210). More generally, any systems capable of determining physical attributes of an item for use in controlling a robotic device can be used, consistent with the functionality described herein.

For example, the camera devices 220(1)-(A) could capture images of the item 250 within the storage container 240, e.g., while the light sources 230(1)-(B) are emitting light to provide optimal lighting conditions for capturing images of the item 250. The robotic control optimization system 150 could then retrieve a three-dimensional surface model of the item, based on a unique identifier corresponding to the item and could determine a plurality of candidate contact points for holding the item 250 using a suction end effector 215 of the robotic picking arm 210, based on the captured one or more images of the item and the three-dimensional surface model of the item.

The robotic control optimization system 150 could then evaluate one or more of the candidate contact points to determine their suitability for use in picking up the item 250 using the suction end effector 215. For example, the robotic control optimization system 150 could determine an expected seal quality metric for a first one of the candidate contact points, by processing the three-dimensional surface model of the item and physical properties of the suction device of the robotic picking arm. In doing so, the robotic control optimization system 150 could model deformation and contact between the suction device and the first candidate contact point, using at least one three-dimensional spring-lattice to model deformation and contact between the suction device and the first candidate contact point on the item, such that potential energy across the three-dimensional spring-lattice is minimized.

The robotic control optimization system 150 could further calculate the expected seal quality metric, using the three-dimensional spring-lattice and a fluids model relating fluid force and leak pathways. The robotic control optimization system 150 could then determine, based on the expected seal quality metric, whether to retrieve the item from the storage container by holding the item at the first candidate contact point using the suction end effector 215 of the robotic picking arm 210. Of note, while the depicted embodiment includes a suction end effector 215 mounted onto a robotic picking arm 210, such an example is provided for illustrative purposes only and without limitation. More generally, embodiments described herein can be used to evaluate the expected seal quality for any type of suction device or suction end effector.

Figure 3:
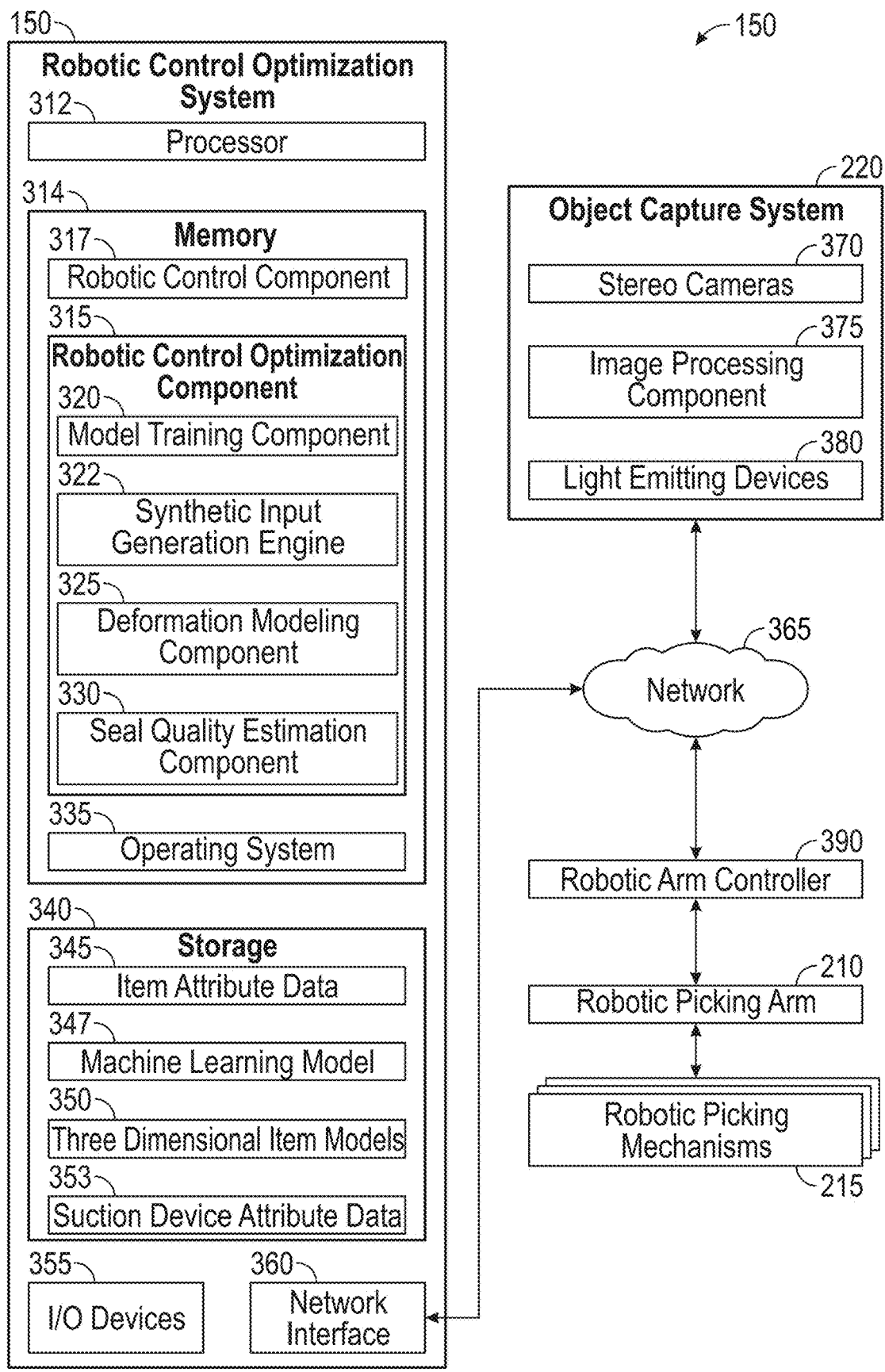
FIG. 3 is a block diagram illustrating a robotic control optimization system, according to one embodiment described herein.

FIG. 3 is a block diagram illustrating a robotic control optimization system, according to one embodiment described herein. As shown, the system 300 includes a model generation system 150, an object capture system 200, sensor devices 368, and a robotic arm controller 390 for controlling a robotic picking arm 210, all connected via network 365. The object capture system 200 includes stereo cameras 370, an image processing component 375, and light-emitting devices 380. Generally, the image processing component 375 processes digital images captured by the stereo cameras 370. For example, the image processing component 375 could perform a color balancing operation across all of the images of a particular item from the stereo cameras 370. As another example, the image processing component 375 may apply one or more filters to the images. More generally, the image processing component 375 can perform any suitable processing on the captured images, according to embodiment described herein. The robotic picking arm 210 includes a plurality of suction end effectors 215.

The robotic control optimization system 150 includes a processor 312, memory 314, storage 340, I/O devices 355, and a network interface 360. Processor 312 is intended to be representative of a single CPU, multiple CPUs, a single CPU having multiple processing cores, and the like. The memory 314 is included to be representative of a random access memory. As shown, memory 314 includes a robotic control component 317, the robotic control optimization component 315 and an operating system 335. The robotic control optimization component 315 includes a model training component 320, a synthetic input generation engine 322, a deformation modeling component 325 and a seal quality estimation component 330. Storage 340 includes item attribute data 345, three-dimensional item models 350 and suction device attribute data 353. The storage 340 may be a disk drive storage device. Although shown as a single unit, the storage 340 may be a combination of a fixed and/or removable storage, such as fixed disc drives, removable memory cards, optical storage, network attached storage (NAS), or storage-area-network (SAN). The network interface 360 may be any type of network communications allowing the robotic control optimization system 150 to communicate with other computers via a data communications network (e.g., network 365).

In one embodiment, the robotic control component 317 could receive instructions (e.g., from the management module 110) to retrieve a particular item from a specified location. The robotic control component 317 could retrieve a three-dimensional item model 350 corresponding to the particular item to be retrieved, and the robotic control component 317 could receive one or more captured one or more images of the retrieval location (e.g., a particular holder or tote within an automated product distribution center) from the object capture system 220.

In one embodiment, the robotic control component 317 is given instructions to take an item from a particular location, but is not given any identifying information for the item. In such an embodiment, the robotic control component 317 could instruct the object capture system 220 to capture images of the item in the particular location and the robotic control component 317 could determine which of the three-dimensional item models 350 best matches the appearance of the item in the captured images. The robotic control component 317 could then retrieve the three-dimensional item model 350 that best matches the item, for use in retrieving the item.

Once the three-dimensional item model 350 is retrieved, the robotic control component 317 can then use the three-dimensional item model 350 for one or more object identification operations. For instance, the robotic control component 317 could analyze images captured of the retrieval location and determine whether the particular item is present within the retrieval location. As an example, the robotic control component 317 could determine whether any portion of the captured image(s) substantially matches an appearance of the three-dimensional item model 350 for the particular item from any viewpoint and from various distances (e.g., a predefined range of distances). If the robotic control component 317 determines a portion of the image substantially matches an appearance of the three-dimensional item model 350 for the particular item, the robotic control component 317 determines that the particular item is present at the retrieval location at a location corresponding to the matching portion of the image.

Additionally, in one embodiment, the robotic control component 317 determines an estimated pose of the particular item at the designated location, using the three-dimensional item model 350. For example, the robotic control component 317 could extrapolate the item's pose, based on calibration information specifying the relative three-space location of the camera capturing the image, as well as the viewpoint from which the three-dimensional item model 350 matched the portion of the captured image. The robotic control component 317 can then use the estimated pose of the particular item to determine an optimal way to instruct the robotic arm controller 390 to control the robotic picking arm 392, in order to best retrieve the particular item. For example, the robotic control component 317 could determine an angle of approach, an optimal surface for grasping the particular item, and so on, based on the object's estimated pose as well as object profile information for the particular item. For example, the object profile information could specify an optimal surface upon which to grasp the particular item using a suction end effector of the robotic picking arm 392. The robotic control component 317 could determine a candidate contact point on the optimal surface, based on the particular item's current pose, and could instruct the robotic arm controller 390 to manipulate the robotic picking arm 392 to grasp the particular item by the optimal surface from a determined optimal angle.

In one embodiment, the robotic control component 317 determines an optimal manner to release a given object using a corresponding one of the three-dimensional item model 350. For example, once the robotic control component 317 has picked up the object in an optimal manner, the robotic control component 317 could determine an optimal manner to release the object in the specified destination location (e.g., within a tote container within an automated product distribution center). In doing so, the robotic control component 317 can retrieve an object profile for the object that specifies an optimal resting surface for the object (e.g., a flat surface of the object on which the object can rest in a stable manner). The robotic control component 317 could then determine how to orient the object so that the optimal surface is downward-facing, using the corresponding three-dimensional item model 350.

In one embodiment, the robotic control component 317 determines a plurality of candidate contact points for holding a first item using a suction device of a robotic picking arm, based on an estimated surface geometry of the first item (e.g., expressed as a point cloud, expressed as a depth map, etc.). For example, the robotic control component 317 could determine an optimal exposed surface of the item based on the item's pose and the object profile information, and the robotic control component 317 could determine a number of different candidate contact points on the optimal exposed surface. The robotic control optimization component 315 could then evaluate the different candidate contact points to determine whether any of the candidate contact points are acceptable for use in retrieving the item using a suction end effector and, if so, which of the candidate contact points is optimal for use in picking up the item using the suction end effector.

The robotic control component 320 can then attempt to retrieve the item by instructing the robotic arm controller 390 to manipulate the robotic picking arm 210 to retrieve the item at the optimal contact point and in a determined manner. The robotic control component 320 could then monitor the success of the picking operation and can store data describing the picking operation and whether the operation succeeded. For example, if the robotic picking arm 210 successfully picked up the item using the suction device end effector and transported the item to the item's intended destination without unintentionally dropping the item, the robotic control component 320 could store data indicating that the picking operation was a success. On the other hand, if the robotic control component 320 determines that the robotic picking arm 210 failed to pick up the item or if the robotic picking arm 210 unintentionally dropped the item on the way to the item's intended destination, the robotic control component 320 could store data indicating that the picking operation was unsuccessful.

The model training component 320 could then use the recorded data to train the machine learning model 347 to determine, based on a given set of inputs, an optimal way to control the robotic picking arm 210 and a contact point on a given item for use in picking up the item using a suction device end effector of the robotic picking arm. For example, such a machine learning model could accept as inputs a three-dimensional model of an item, a pose of the item, metadata describing the item, metadata describing a suction device to be used in picking up the item, metadata describing the robotic picking arm to be used in picking up the item, and so on. Such data could be provided to the machine learning model, for example, as raw data, a processed version of the raw data or a combination of both.

As discussed above, while training the machine learning model 347 using observed real-world data can be very beneficial, such data may not be available for all products in an extensive product catalog for a fulfillment center. Moreover, it can be costly and time consuming to generate such real-world data solely for the purpose of training the machine learning model 347. As such, the model training component 320 can perform an offline training operation for the machine learning model 347 by simulating the retrieval of an item using the machine learning model's 347 output and by refining the machine learning model 347 based on the success or failure of the simulated operation. For example, the model training component 320 could determine a robotic control operation and a candidate contact point for holding a first item using a suction device of a robotic picking arm, by processing information describing the first item as an input to a machine learning model. The model training component 320 could then estimate a seal quality metric for the candidate contact point, based on a predicted deformed three-dimensional shape of the suction device and a three-dimensional shape associated with the first item. The model training component 320 could then refine one or more weights within the machine learning model based on the estimated seal quality metric.

Figure 4:
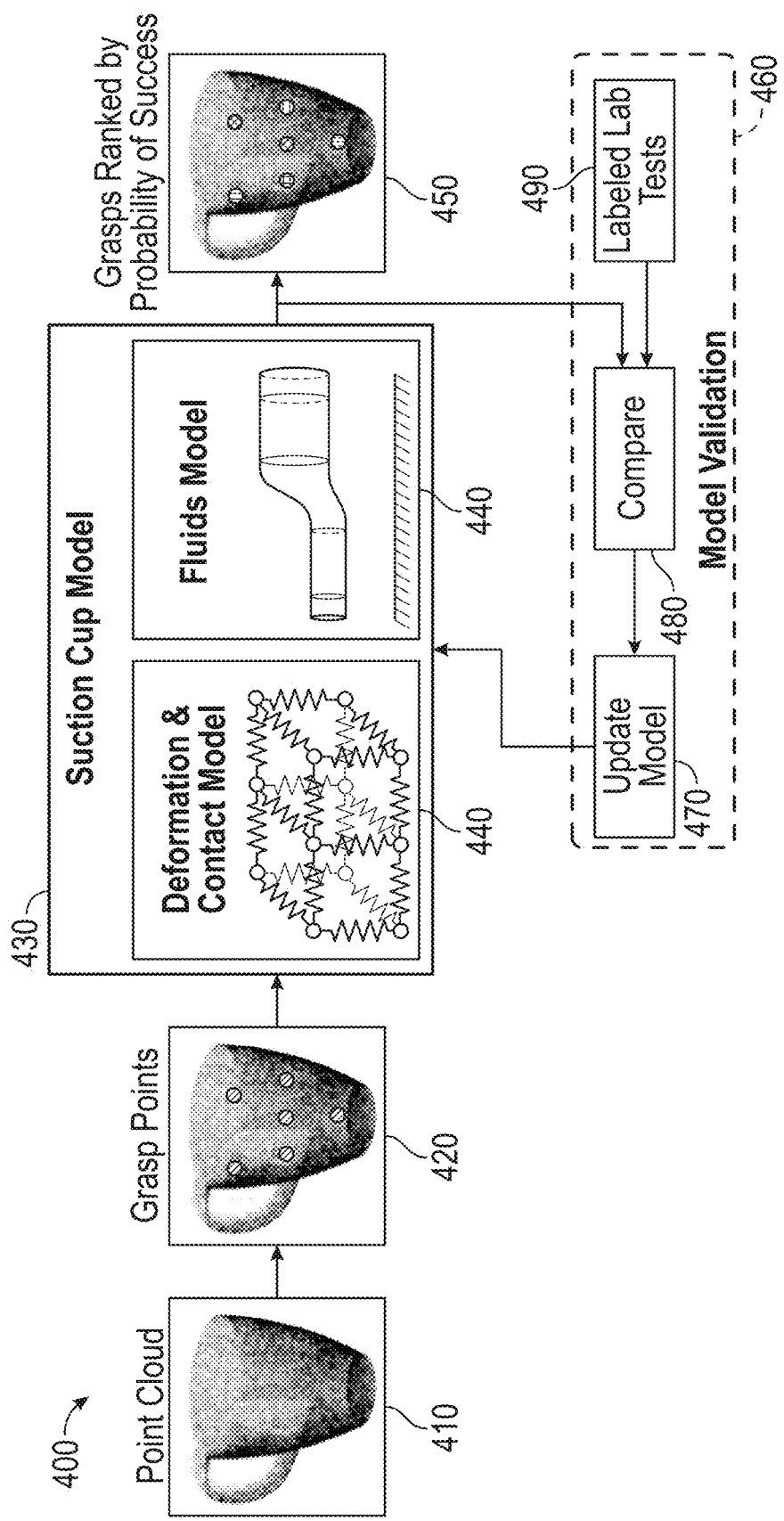
FIG. 4 is a block diagram illustrating a workflow for ranking candidate contact points on an item through the use of a suction cup model, according to one embodiment described herein.

FIG. 4 is a block diagram illustrating a workflow for ranking candidate contact points on an item through the use of a suction cup model, according to one embodiment described herein. As shown, the workflow 400 begins at block 410, where the robotic control optimization component 315 retrieves a point cloud defining a three-dimensional shape of an item to be retrieved. Generally, the point cloud represents a set of data points in a coordinate system that collectively describe the three-dimensional shape of the item. For example, the point cloud could be generated automatically as part of new product intake procedures at the fulfillment system and stored within a database. In such an example, the robotic control optimization component 315 could then retrieve the point cloud from the database, by issuing a query specifying at least a unique identifier corresponding to the item to be retrieved.

The robotic control optimization component 315 then determines a number of candidate grasp points on the surface of the point cloud (block 420). For example, the robotic control optimization component 315 could determine that a particular surface(s) of the item is exposed, based on the item's current pose (e.g., determined by analyzing one or more images of the physical item), and the robotic control optimization component 315 could then select the candidate grasp points on the exposed surface(s) of the item. That is, the robotic control optimization component 315 could exclude from consideration any contact points that would not be adequately reachable using the suction end effector of the robotic picking arm, e.g., points on the surface on which the item is resting. The robotic control optimization component 315 could then generate a suction cup model (block 430) for use in evaluating the candidate contact points.

In the depicted example, the deformation modeling component 325 of the robotic control optimization component 315 generates a deformation and contact model that represents the surface of the suction end effector. For example, the deformation modeling component 325 could generate a spring lattice data model that represents the soft elastic material of the suction end effector using a number of simulated torsion and compression springs. Additionally, the deformation modeling component 325 could determine a shape of the spring lattice model that corresponds to a minimal energy pose of the spring lattice model. In other words, the deformation modeling component 325 could assume that there is a feasible, lower-energy state that the elastic material can assume, then the material is presumably not in its final resting state. Once the deformation modeling component 325 determines the three-dimensional shape of the spring lattice data model that minimizes the potential energy within the model, the deformation modeling component 325 can determine that the determined three-dimensional shape represents the deformed shape of the suction end effector when a seal is created. The seal quality estimation component 330 can then use the deformed shape to estimate a quality of the seal that would be formed between the suction end effector and the particular item in question.

As mentioned above, in one embodiment the soft elastic material is represented as a lattice of connected springs. Each connection point within the lattice can be represented as a node n, and a node can be indexed by the iterators i and j, representing the ordinal row and column position of the node within the lattice (i.e., $n_{i,j}$). For purposes of the following example, assume that $x_{i,j}$ and $y_{i,j}$ represent the continuous position of the indexed node. As such the state of the lattice X can be referred to as the assemblage of the continuous position of all the nodes into a single column vector, as shown below in Equation 1.

$$X = \begin{bmatrix} x_{i,j} \\ y_{i,j} \end{bmatrix} \forall\, i, j \quad \text{Equation 1 - Lattice State}$$

The deformation modeling component 325 could determine that a node is in a feasible position if the node does not lie within the boundary of the colliding object (e.g., the item being picked up using the suction end effector). That is, such a constraint can be imposed because the physical material of the suction device cannot penetrate the item being picked up. More specifically, this constraint may be represented as $0<|r_{i,j}|-|d_{i,j}| \forall i,j$, where d represents the Euclidean vector originating at the object's center and terminating at the indexed node, and r represents the effective radius originating from the object's center, collinear with d, and terminating at the object's boundary.

The robotic control optimization component 315 could then determine a shape of the spring lattice that minimizes the potential energy E stored within the lattice. More specifically, the deformation modeling component 325 could solve the following Equation 2, where E represents the summed potential energy of each deformed spring in the lattice.

$$X^* = \min_X E \qquad \text{Equation 2 - Deformed Lattice State}$$

Figure 5:
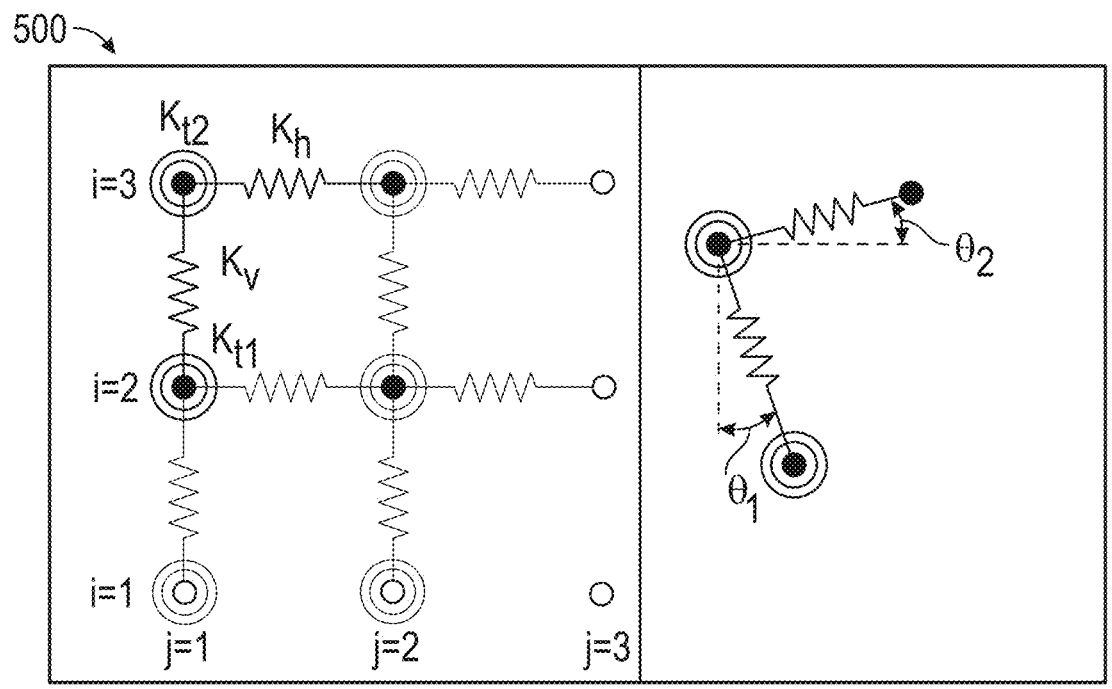
FIG. 5 illustrates a portion of a three-dimensional spring lattice for use in determining a deformed three-dimensional shape, according to one embodiment described herein.

FIG. 5 illustrates a portion of a three-dimensional spring lattice for use in determining a deformed three-dimensional shape, according to one embodiment described herein. As shown, the illustration 500 depicts a portion of a spring layout within the lattice, where horizontal $k_h$ and vertical $k_v$ linear springs connect each node. Additionally, torsional springs $k_t$ store energy as the linear springs rotate about the nodes. Generally, the deformation modeling component 325 can adjust the stiffness values for each of these linear and torsional strings based on the suction device attribute data 353, e.g., data describing the malleability of the suction cup material. The lattice's total potential energy can be calculated for a given lattice state X, using the following procedure shown in Procedure 1.

$$E = 0, \text{ for } i = 1 \ldots I$$
$$\text{for } j = 1 \ldots J$$
$$E = E + \frac{1}{2}k_v\left(\sqrt{(x_{i,j} - x_{i-1,j})^2 + (y_{i,j} - y_{i-1,j})^2} \ldots l_v\right)^2 \ldots +$$
$$\frac{1}{2}k_h\left(\sqrt{(x_{i,j} - x_{i,j+1})^2 + (y_{i,j} - y_{i,j+1})^2} - l_h\right)^2 \ldots + \frac{1}{2}k_i\theta_1 + \frac{1}{2}k_i\theta_2.$$

Procedure 1—Total Potential Energy Calculation

The deformation modeling component 325 can then evaluate the nonlinear optimization problem of determining the shape of that lattice that minimizes the total potential energy within the lattice. For example, the deformation modeling component 325 can seek to find an optimal state X* that minimizes the potential energy in the lattice E, subject to the constraint that the lattice nodes do not lie within the interior of the colliding object (e.g., the item that is being picked up using the suction device). More formally, the optimal state can be expressed using Equation 2 discussed above, subject to the constraint $0<|r_{i,j}|-|d_{i,j}| \forall i,j$.

Additionally, in solving for the optimal state of the lattice, the deformation modeling component 325 can provide a nonlinear solving component with analytical gradients relating changes in both the objective function E and the node position constraint to changes in X. For example, $$\frac{\partial E}{\partial x_{i,j}}$$

could be one element of the gradient matrix, and could describe the change in potential energy due to a change in the x-coordinate position of node i,j. Such gradients can be calculated using any suitable symbolic math tools, consistent with the functionality described herein.

Figure 6:
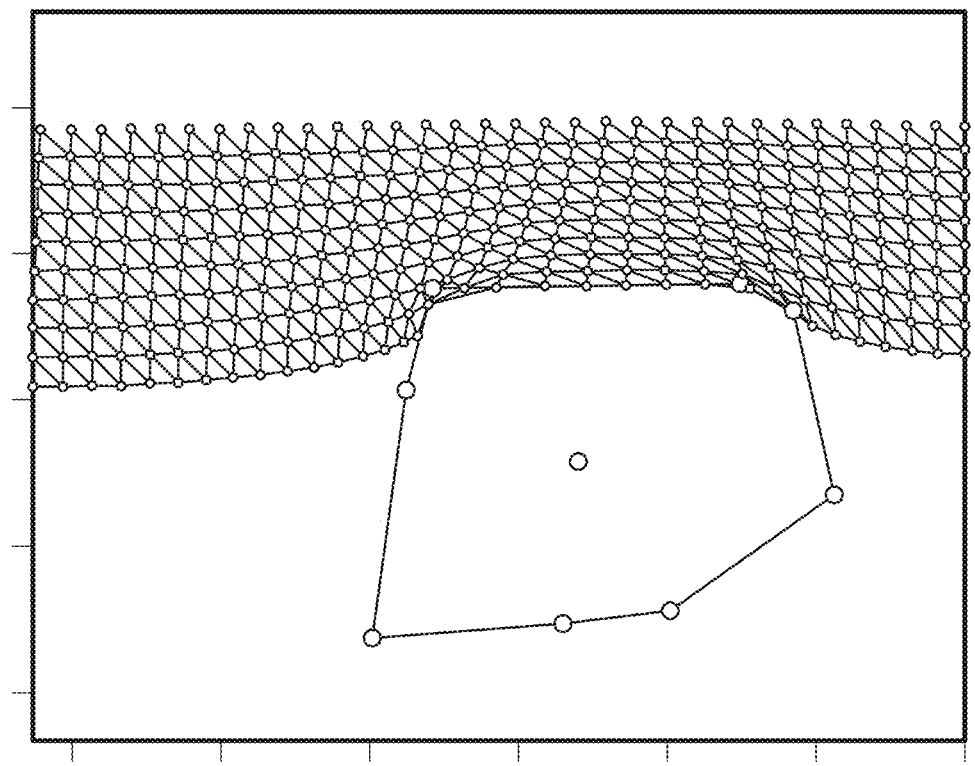
FIG. 6 illustrates a deformed three-dimensional shape of a suction cup device in contact with an item surface, according to one embodiment described herein.

In one embodiment, the deformation modeling component 325 can assume that the item being picked up using the suction end effector will remain relatively constant in shape despite the force exerted by the suction end effector. As such, the deformation modeling component 325 can model the contact between such an item and the suction end effector by using a static three-dimensional shape representing a portion of the item corresponding to the selected contact point. FIG. 6 illustrates a deformed three-dimensional shape of a suction cup device in contact with an item surface, according to one embodiment described herein. As shown, the diagram 600 illustrates such an example. As shown, the deformed three-dimensional mesh 610 corresponds to the shape of the spring lattice with a minimal potential energy value, while the fixed three-dimensional shape 620 corresponds to the shape of the item corresponding to the contact point. Generally, such an embodiment may be preferable when the surface of the item being picked up is relatively rigid and deforms very little (if at all) when under the force exerted by the suction device.

Figure 7:
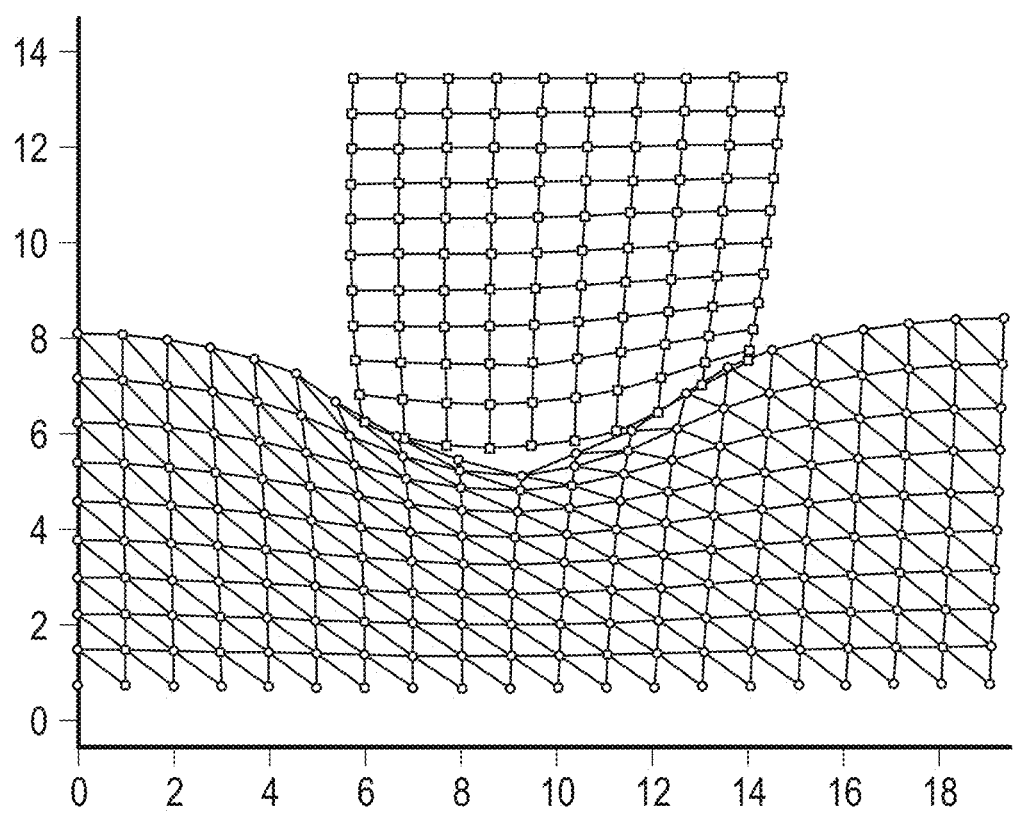
FIG. 7 is a flow diagram deformed three-dimensional shapes of a suction cup device in contact with a malleable item surface, according to one embodiment described herein.

Other items, however, may deform in shape significantly when under the force of the suction device. For example, while an item within relatively thick cardboard packaging may deform very little when under the force exerted by the suction device, a malleable item within relatively thin plastic packaging may deform significantly when the suction device exerts a force on the surface of the item's packaging. In such a situation, the deformation modeling component 325 can generate a second spring lattice representing the surface of the item, as illustrated in FIG. 7, which is a flow diagram deformed three-dimensional shapes of a suction cup device in contact with a malleable item surface, according to one embodiment described herein. In such an embodiment, the deformation modeling component 325 can adjust a stiffness value for the springs within the lattice (e.g., with each spring having a respective stiffness value), based on physical attributes of the item. For example, a more malleable item could have relatively lower stiffness values, whereas a relatively rigid item could have greater stiffness value. The deformation modeling component 325 could then determine the shape of the spring lattice representing the shape of the item under force that minimizes the potential energy across all of the springs of the lattice. As shown in FIG. 7, the illustration 700 includes a first deformed three-dimensional shape representing the shape of the suction device 710 under the force exerted by the suction seal between the item and the suction device, and a second deformed three-dimensional shape representing the shape of the item under the same force.

Once the deformation modeling component 325 has generated the deformed three-dimension shape representing the suction device under the force (and potentially the deformed three-dimensional shape representing the item under the force (as shown in FIG. 7), the seal quality estimation component 330 can generate a seal quality metric that estimates the strength of the seal between the item and the suction cup device, based on the deformed three-dimensional shape of the suction cup device (i.e., the three-dimensional shape of the suction cup device under the force exerted by the suction seal between the suction cup device and the item) and the three-dimensional shape of the item (e.g., a fixed three-dimensional shape for a rigid item, a deformed three-dimensional shape representing the shape of the item under the force exerted by the suction cup seal, etc.).

In calculating the seal quality metric, the seal quality estimation component 330 can take into consideration a number of different factors. A non-exhaustive list of such factor could include, for example, the item's geometry, the item's pose, the item's inertia (e.g., while coming into contact with the suction cup device, while being carried by the suction cup device, etc.), as well as the suction cup's geometry and bulk modulus (e.g., a measure of how resistant to compressibility the material of the suction cup is). Additionally, the seal quality estimation component 330 could identify any leak pathways in the contact between the three-dimensional shapes of the suction cup and the item. The seal quality estimation component 330 could further take into account the suction pump's ability to generate static pressure (e.g., using a fluids model).

In one embodiment, the seal quality estimation component 330 can generate a model in which the suction cup device applies a force to the item via a spatial force. For example, this "suction force" can be represented as a vector that originates at a point on the item's surface that is closest to the suction cup's center. Moreover, such a vector can point to the suction cup's center. At each time step of the simulation, the seal quality estimation component 330 can update the direction and magnitude of the vector (i.e., the seal quality estimation component 330 can update the calculated measure of suction force). Of note, while the definition of the direction of the vector remains constant across the time steps of the simulation, the value of the vector can change, as the closest point on the item may change due to the item's movement over time.

Figure 9:
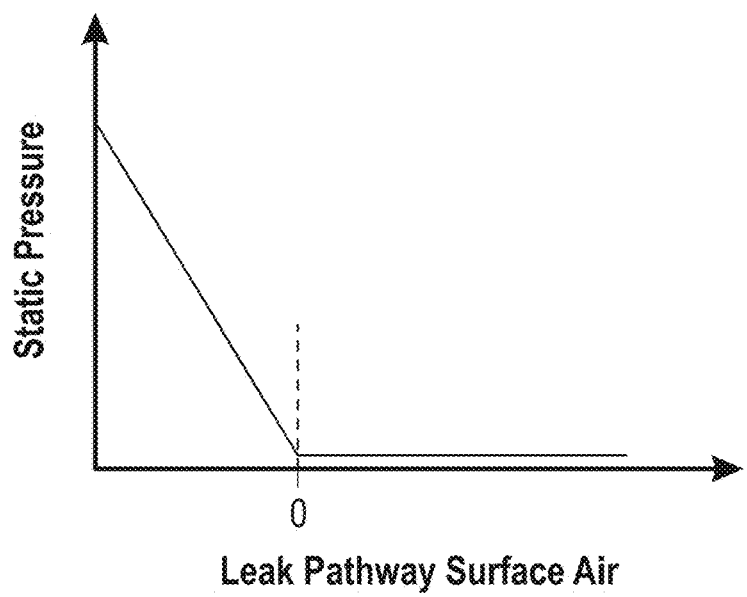
FIG. 9 is a graph illustrating a relationship between static pressure and leak pathway surface air for a seal between a suction device and an item, according to one embodiment described herein.

Generally, the force's magnitude is proportional to any air leak pathways between the suction cup and the item surface. An example of such a magnitude is shown in FIG. 9, which is a graph illustrating a relationship between static pressure and leak pathway surface air for a seal between a suction device and an item, according to one embodiment described herein. As shown in the graph 900, the static pressure value is highest (e.g., equal to the static pressure that the vacuum pump is capable of exerting) when the leak pathway surface air is at 0, i.e., when no leak pathways exist. As the value of the leak pathway surface air increases, the static pressure of the seal decreases, until the static pressure value reaches 0. At this point, no vacuum seal exists between the item and the suction device, and the static pressure value remains 0 for any further increases in the leak pathway surface air.

Figure 8:
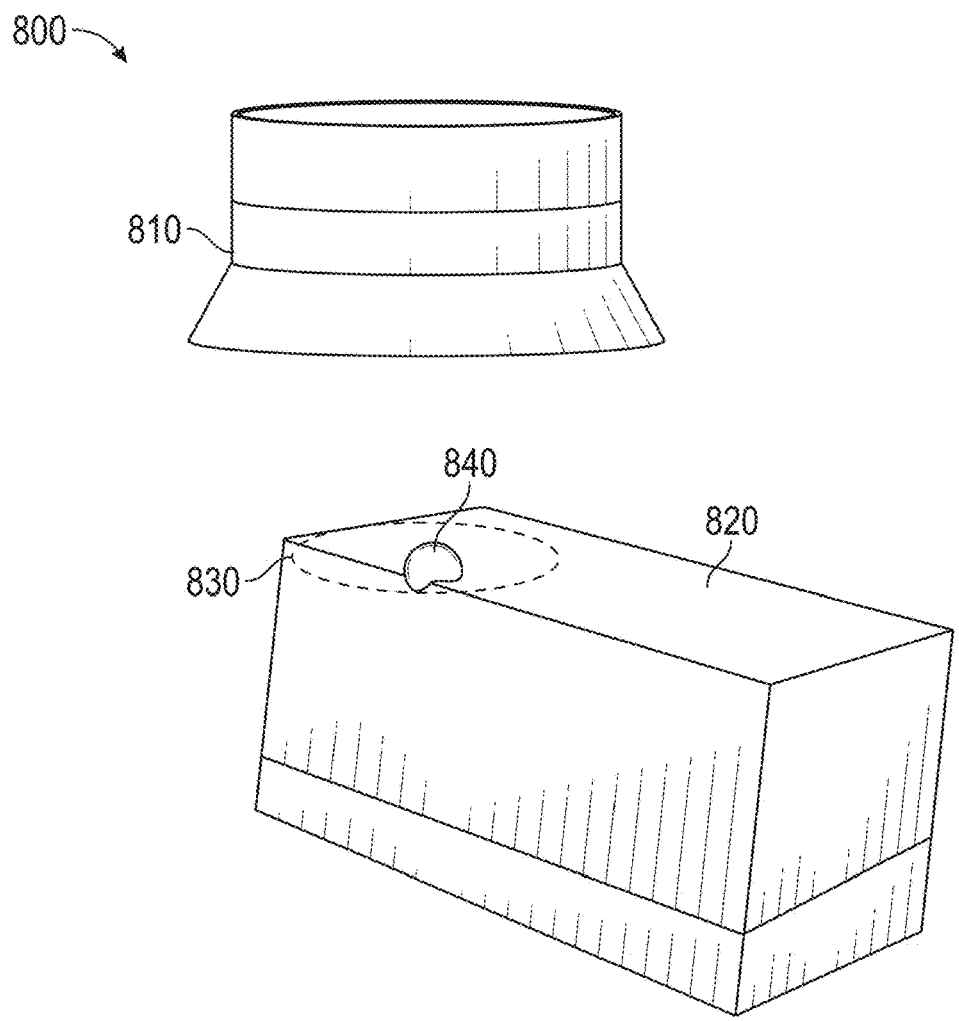
FIG. 8 is an illustration of a simulation for calculating an estimated seal quality metric between a suction cup and an item, according to one embodiment described herein.

In one embodiment, the seal quality estimation component 330 is configured to perform a ray casting operations to effectively project a two-dimensional suction area onto the item's surface. This area is shown in FIG. 8, which is an illustration of a simulation for calculating an estimated seal quality metric between a suction cup and an item, according to one embodiment described herein. As shown, the illustration 800 depicts a virtual representation of a suction device 810 and a virtual representation of an item 820. As shown, the seal quality estimation component 330 has projected a circular two-dimensional suction area 830 having a central point 840 onto the surface of the item 820.

Based on whether each ray hits the item 820 and, for the rays that hit the item 820, the distance each ray traveled before intersecting with a respective point on the item 820, the seal quality estimation component 330 can numerically integrate to estimate the three-dimensional surface through which air can flow between the suction device 810 and the item 820.

In one embodiment, the seal quality estimation component 330 can use a piecewise linear model to relate the surface area to the static vacuum pressure developed between the suction device 810 and the item 820. In such an embodiment, if the seal quality estimation component 330 determines that the surface area is above a predefined threshold level of surface area, the seal quality estimation component 330 can determine that fluid impedance is negligible and no static pressure is developed. On the other hand, where the surface area is equal to zero (i.e., when the surface of the item 820 includes the entirety of the surface of the suction device 810), fluid pressure reaches a defined maximum value (e.g., equal or substantially equal to the maximum static pressure produced by the vacuum pump). For all values in between these extremes, the seal quality estimation component 330 can calculate the fluid pressure as a value that is linearly proportional to the surface area. As such, the seal quality estimation component 330 can express the magnitude of the force as the product of fluid pressure and the two-dimensional suction area 830.

Figure 10:
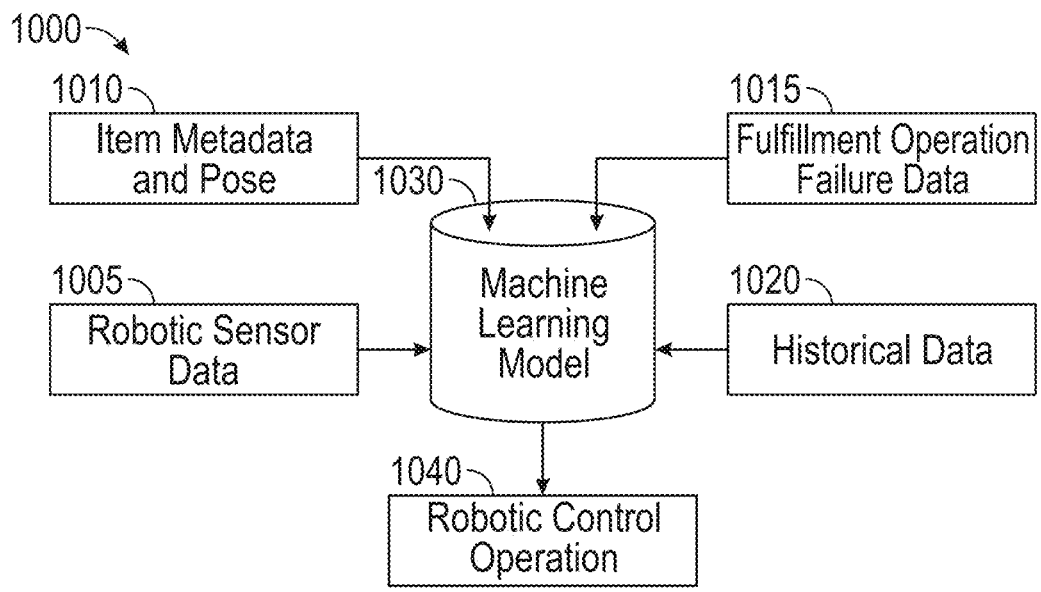
FIG. 10 illustrates a workflow for training and using a machine learning model for determining a robotic control operation, according to one embodiment described herein.

FIG. 10 illustrates a workflow for training and using a machine learning model for determining a robotic control operation, according to one embodiment described herein. As shown, the workflow 1000 illustrates a number of different inputs to a machine learning model 1030, the inputs including robotic sensor data 1005, item metadata and pose 1010, fulfillment operation failure data 1015 and historical data 1020. Generally, the robotic sensor data 1005 represents data collected from one or more sensor devices associated with the robotic picking arm 210. Examples of such sensor devices include, without limitation, temperature sensors, a ceramic piezoelectric sensor, an accelerometer, and so on. More generally, any sort of sensor data having any sort of relationship or association with the performance of the robotic picking arm 210 can be considered, consistent with the functionality described herein.

The item metadata and pose information 1010 generally includes data describing physical attributes of an item, as well as the item's pose for purposes of a given picking operation. The item's pose can be expressed using a coordinate system that is known to the machine learning model 1030. The item metadata can include information such as the weight of the item, the malleability of the surface of the item, a measure of air permeability of the surface of the item, and so on. In one embodiment, the item metadata can be retrieved from the item attribute data 345. For example, where item attribute data 345 is stored within a database, a query can be generated specifying a unique identifier for a particular item and executed against the database to retrieve the item metadata corresponding to the particular item. The pose information can be determined by analyzing one or more captured images of a physical object or, alternatively, can be generated by the synthetic input generation engine 322.

The fulfillment operation failure data 1015 generally represents observed picking operation failures within a fulfillment center. As discussed above, such failure events can include where the suction device end effector failed to pick up the item, where the item was successfully picked up but prematurely dropped in transit to an intended destination and so on. For such events, the fulfillment operation failure data 1015 could specify an identifier for the item involved in the historical picking operation, the behavior that the robotic picking arm performed in attempting to pick up the item, the contact point on the surface of the item that the robotic picking arm attempted to pick the item up from using the suction device end effector, and so on. Similarly, the historical data 1020 represents other data collected from historical picking operations performed by a robotic arm configured with a suction device end effector within a fulfillment center. Such data can include, for example, data describing the item involved in the historical picking operation, behavior that the robotic picking arm performed when successfully picking up the item, the contact point on the surface of the item that the robotic picking arm picked the item up from using the suction device end effector, and so on.

The machine learning model 1030 can consider the aforementioned data during a training phase and, for a given item and pose, the machine learning model 1030 can output a robotic control operation 1040 for retrieving the given item using a robotic picking arm 210 with a suction device end effector. For example, the machine learning model 1030 could output data that can be transmitted (e.g., either directly or after processing) to the robotic arm controller 390 for use in controlling the robotic picking arm 210. Of note, while the various types of information 1005, 1010, 1015 and 1020 are shown as directly feeding into the machine learning model 1030, one of ordinary skill in the art will recognize that various forms of information can be pre-processed in a variety of ways before being input into the machine learning model 1030. For example, a given training sample for the machine learning model 1030 can be vectorized according to a predefined schema, before being processed by the machine learning model 1030 as a training sample.

Figure 11:
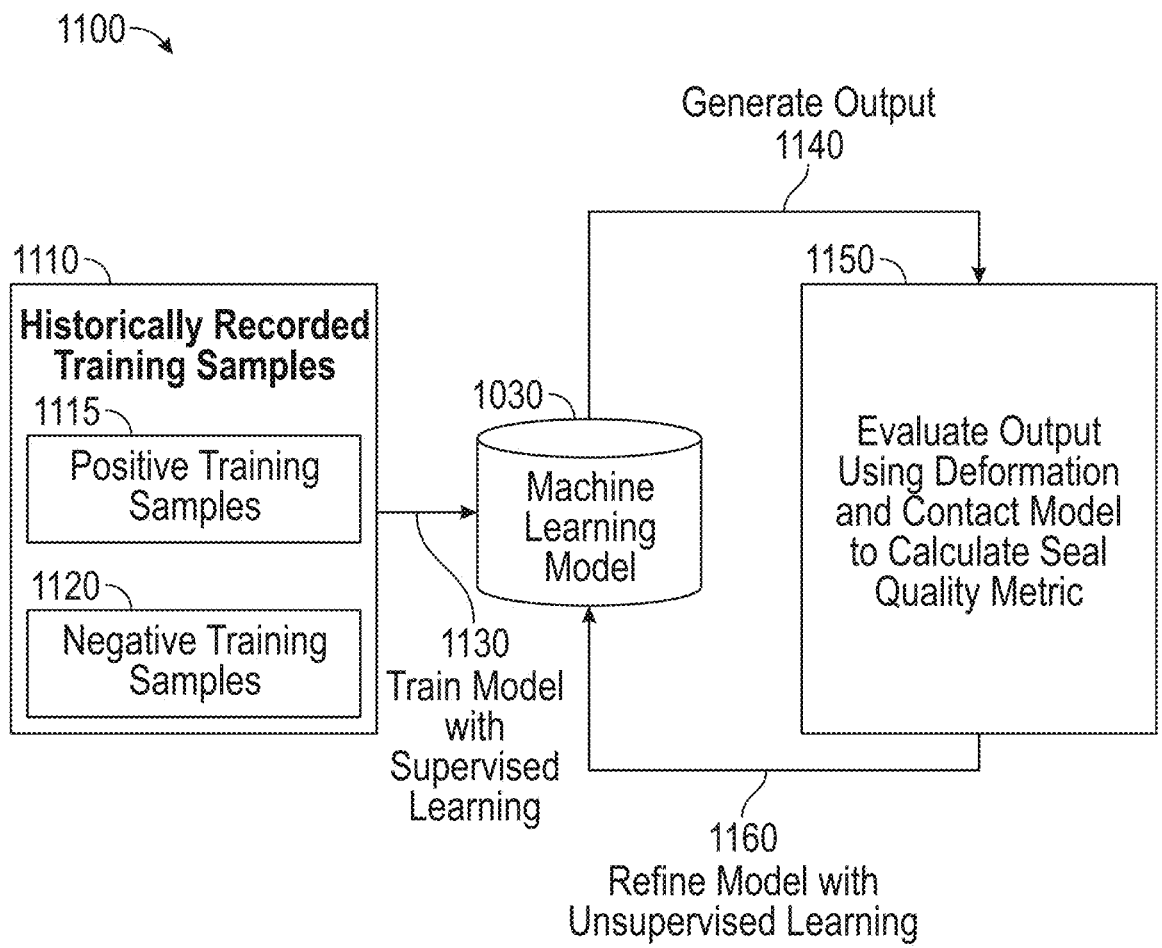
FIG. 11 illustrates a workflow for initially training a machine learning model and refining the machine learning model by calculating seal quality metrics to evaluate the output of the machine learning model, according to one embodiment described herein.

An example of a training operation is shown in FIG. 11, which illustrates a workflow for initially training a machine learning model and refining the machine learning model by calculating seal quality metrics to evaluate the output of the machine learning model, according to one embodiment described herein. As shown, the workflow 1100 depicts a plurality of historically recorded training samples 1110 being fed into the machine learning model 1030 during a training phase. In one embodiment, the model training component 320 is configured to process at least the robotic sensor data 1005, the item metadata and pose information 1010, the fulfillment operation failure data 1015 and the historical data 1020 to generate the historically recorded training samples 1110. As discussed above, in doing so, the model training component 320 can generate a vector or other numerical or alphanumerical expression, based on the various types of information describing historical picking operations within a fulfillment center(s).

In the depicted embodiment, the historical picking operations have been categorized into positive training samples 1115 and negative training samples 1120. For example, the positive training samples 1115 could include representations of historical picking operations in which the robotic picking arm successfully picked up and transported an item to its intended destination using the suction device end effector. Continuing the example, the negative training samples 1120 could include representations of historical picking operations in which the robotic picking arm either failed to pick up an item using the suction device end effector or, after picking up the item, prematurely dropped the item before placing the item at its intended destination.

As shown, the model training component 320 uses the historically recorded training samples 1110 to train the machine learning model 1030 (at 1130). The model training component 320 can then perform a refinement operation for the machine learning model 1030, where the model training component 320 feeds a synthetic input for a picking operation for a particular item into the machine learning model 1030 to generate an output (at 1140), and the robotic control optimization component 315 evaluates the output using a deformation and contact model to calculate a seal quality metric for a seal that would be created between the suction device end effector and the particular item, if the picking operation were performed.

For example, the model training component 320 could determine a first behavior for retrieving an item from within a storage container by holding the item at a contact point using a suction device of the robotic arm, as a result of processing a first set of inputs generated by the synthetic input generation engine 322 as inputs to the machine learning model 1030. The model training component 320 could then estimate a likelihood of successfully retrieving the item using the determined first behavior. In doing so, the robotic control optimization component 315 could determine an expected seal quality metric for the contact point, by processing a three-dimensional surface model of the item and physical properties of the suction device of the robotic picking arm. In doing so, the model training component 320 could model deformation and contact between the suction device and the contact point on the item, using at least one three-dimensional spring-lattice to model deformation and contact between the suction device and the contact point on the item, such that potential energy across the three-dimensional spring-lattice is minimized. The seal quality estimation component 330 could then calculate the expected seal quality metric, using the three-dimensional spring-lattice and a fluids model relating fluid force and leak pathways (at 1150).

The model training component 320 could then refine the machine learning model to optimize the behavior of the robotic arm, based on the expected seal quality metric (at 1160). For example, upon determining that the expected seal quality metric does not exceed a predefined threshold level of seal quality, the model training component 320 could refine one or more weights within the machine learning model to reduce a correlation between the first set of inputs and the first behavior. As another example, upon determining that the expected seal quality metric exceeds a predefined threshold level of seal quality, the model training component 320 could refine one or more weights within the machine learning model to increase a correlation between the first set of inputs and the first behavior.

Of note, while the workflow 1100 depicts an embodiment where the machine learning model 1030 is initially trained using historically recorded training samples 1110 and is then refined using a deformation and contact model (block 1150), such a workflow is provided for illustrative purposes only and without limitation. In one embodiment, the machine learning model 1030 is trained by, starting with a baseline machine learning model, simulating picking operations for various virtual items within a virtual container (e.g., using three-dimensional models corresponding to the various items and a three-dimensional model of the container). For example, data describing the surface geometry of the virtual item could be input into the machine learning model 1030 and the output of the machine learning model could then be evaluated using the deformation and contact model to calculate a seal quality metric. One or more weights within the machine learning model 1030 could then be refined, and the simulation could be repeated to train the machine learning model 1030. In such an embodiment, the trained machine learning model 1030 could then be deployed for use in a real-world fulfillment center environment, and the machine learning model 1030 could be further refined based on real-world performance data. For example, the machine learning model 1030 could receive surface geometry information for a real-world item and the output of the machine learning model 1030 could be evaluated, based on whether the picking operation for the real-world item was successful.

Figure 12A:
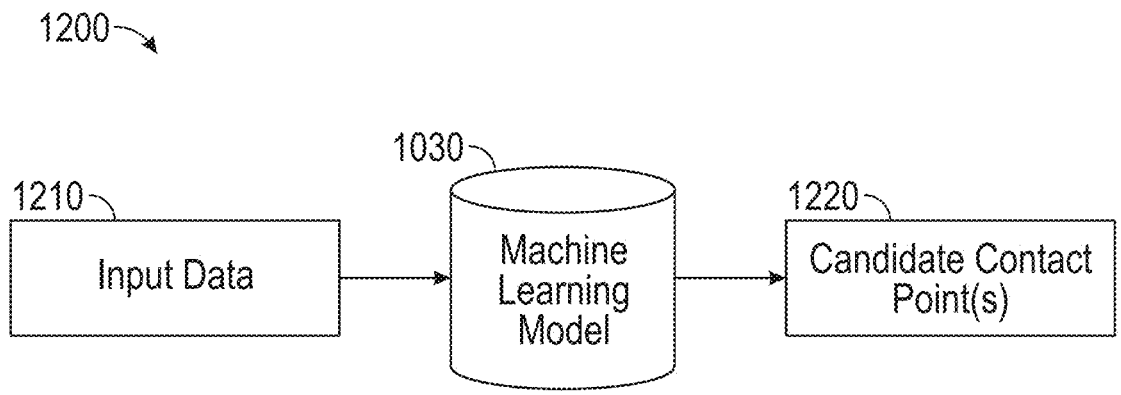
FIGS. 12A-C illustrate various types of machine learning model for controlling a system for a robotic picking arm within a fulfillment center, according to one embodiment described herein.
Figure 12B:
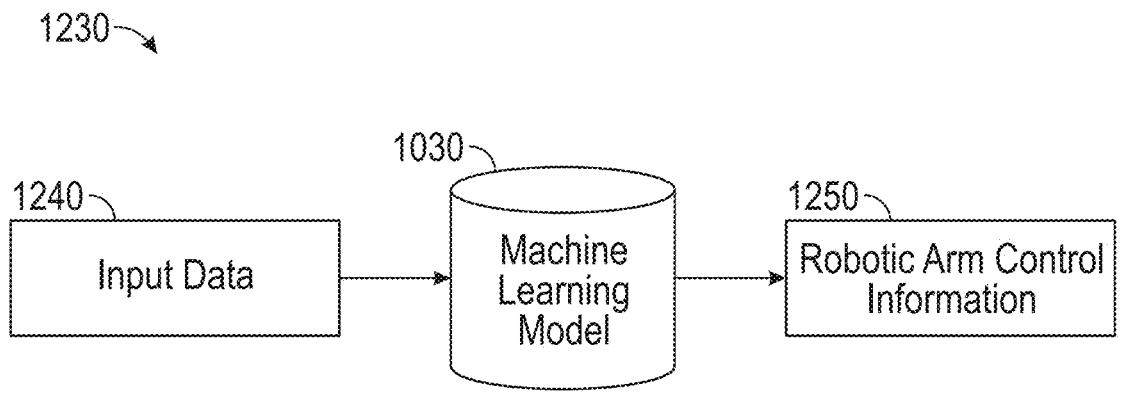
Figure 12C:
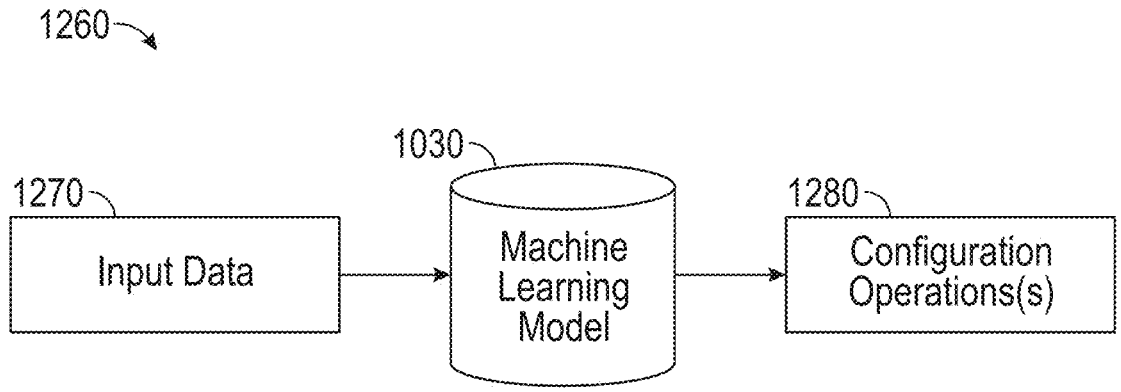

FIGS. 12A-C illustrate various types of machine learning model for controlling a system for a robotic picking arm within a fulfillment center, according to one embodiment described herein. As shown, the illustration 1200 illustrates a machine learning model 1030 that receives input data 1210 and generates an output specifying one or more candidate contact points for retrieving the item using a suction device end effector of a robotic picking arm. For example, the input data 1210 could include a surface geometry for an item and the machine learning model 1030 could be trained to identify optimal picking points on a given surface geometry. The candidate contact point(s) 1220 could then be evaluated using a deformation and contact model and the techniques described herein, and the machine learning model 1030 could be refined based on a result of the analysis. For example, one or more weights within the machine learning model 1030 could be modified, based on whether a given candidate contact point resulted in a relatively high or relatively low estimated seal quality metric, relative to other candidate contact points.

Another example is shown in the illustration 1230, where the machine learning model 1030 processes input data 1240 and outputs robotic arm control information 1250. Such robotic arm control information 1250 could include one or more control operations specifying a measure of motor torque for one or more motors within the robotic picking arm, higher-level signals for controlling the robotic picking arm, such as joint-space trajectories over a window of time, end effector trajectories over a window of time, and so on. Additionally, the robotic arm control information 1250 could specify behaviors for the robotic arm to perform, such as bringing a suction device end effector into contact with the surface of an item and exerting some amount of force against the surface of the item, before turning on a vacuum pump of the suction device end effector. The robotic arm control information 1250 could further specify information as to which suction device end effector (of multiple available suction device end effectors on the robotic arm) to use for a given set of input data, a magnitude of flow for the suction device end effector, and so on. More generally, any information associated with the control of a robotic arm can be included in the robotic arm control information 1250, consistent with the functionality described herein.

In one embodiment, a deformation and contact model is configured to evaluate the robotic arm control information 1250 and to determine a relative effectiveness of the various pieces of control information. For example, a robotic control policy could start with some number of sub-dimensions, and this number could be reduced to a lesser number of sub-dimensions by identifying which sub-dimensions have the greatest impact on successful picking operations through the use of a deformation and contact model.

The illustration 1260 depicts a machine learning model 1030 receiving input data 1270 and outputting one or more configuration operations 1280 for use in configuring a robotic picking arm system. Such configuration operations 1280 could include, without limitation, a measure of illumination to provide while capturing images of items to be picked up using the suction device end effector, the magnitude of suction to be applied when picking up items using the suction device end effector, one or more image filters to be applied to captured images of items to be picked up, and so on. The configuration operations 1280 can then be evaluated using a deformation and contact model, to determine which configuration operations and configuration operation parameters have the greatest impact on the success of the picking operations.

Figure 13:
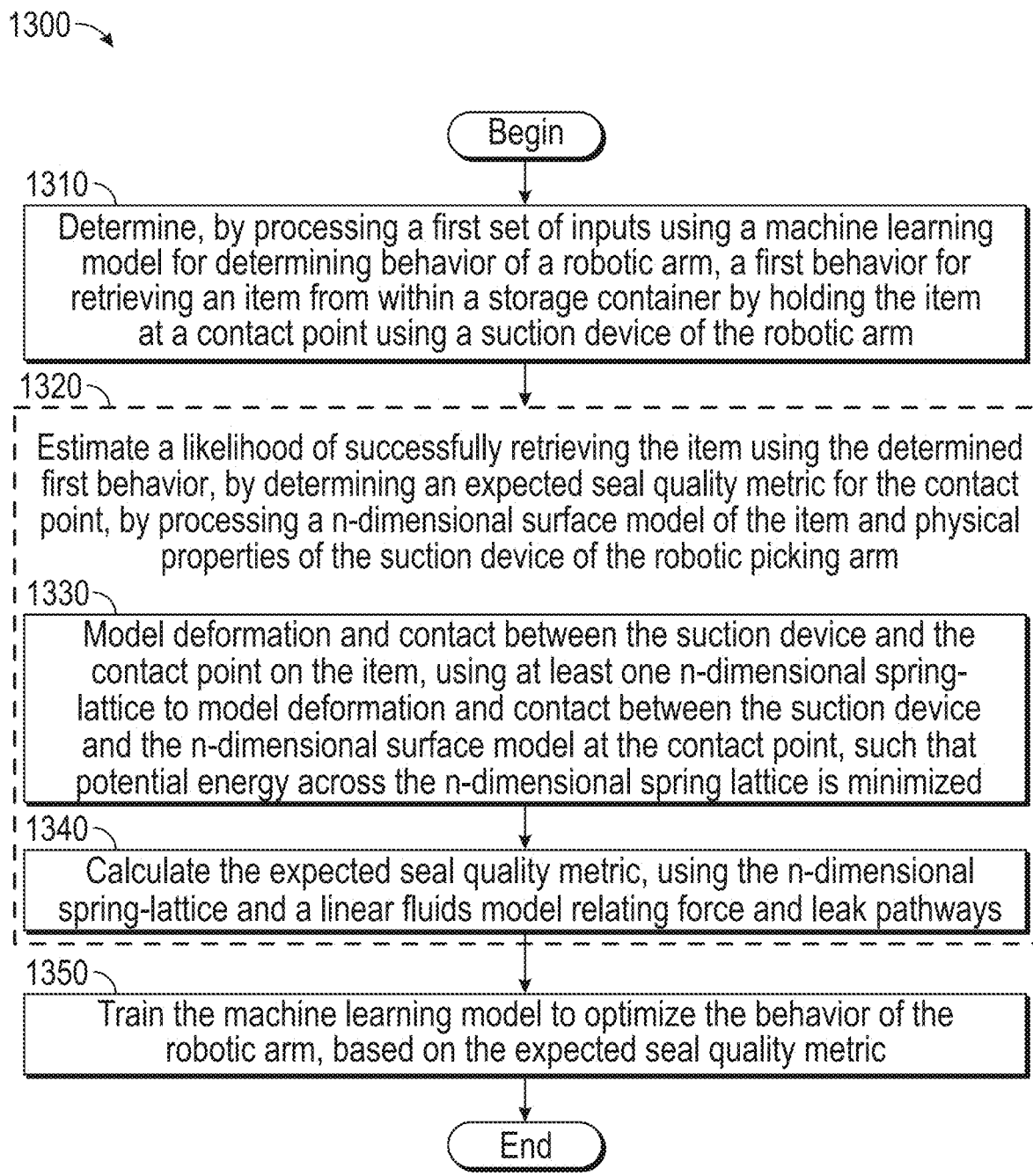
FIG. 13 is a flow diagram illustrating a method for training a machine learning model based on an expected seal quality metric for holding a simulated item at a candidate contact point using a suction device, according to one embodiment described herein.

FIG. 13 is a flow diagram illustrating a method for training a machine learning model based on an expected seal quality metric for holding a simulated item at a candidate contact point using a suction device, according to one embodiment described herein. As shown, the method 1300 begins at block 1310, where the model training component 320 determines, by processing a first set of inputs using a machine learning model for determining behavior of a robotic arm, a first behavior for retrieving an item from within a storage container by holding the item at a contact point using a suction device of the robotic arm. The model training component 320 then estimates a likelihood of successfully retrieving the item using the determined first behavior, by determining an expected seal quality metric for the contact point, by processing a three-dimensional surface model of the item and physical properties of the suction device of the robotic picking arm (block 1320).

In doing so, in the depicted embodiment, the model training component 320 models deformation and contact between the suction device and the contact point on the item, using at least one three-dimensional spring-lattice to model deformation and contact between the suction device and the contact point on the item, such that potential energy across the three-dimensional spring-lattice is minimized (block 1330). Additionally, the model training component 320 calculates the expected seal quality metric, using the three-dimensional spring-lattice and a fluids model relating fluid force and leak pathways (block 1340). The model training component 320 trains the machine learning model to optimize the behavior of the robotic arm, based on the expected seal quality metric (block 1350), and the method 1300 ends.

Figure 14:
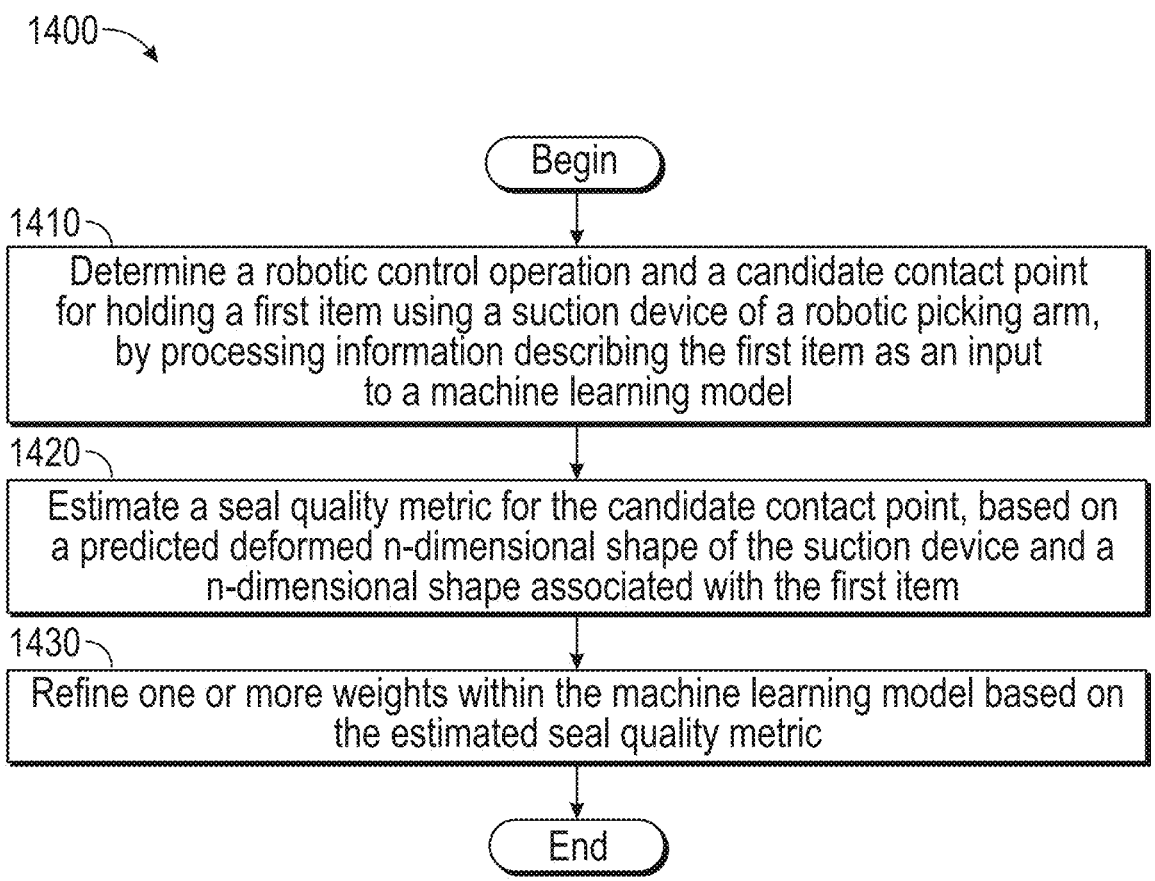
FIG. 14 is a flow diagram illustrating a method for refining weights within a machine learning model based on an estimated seal quality metric for holding an item at a candidate contact point using a suction device end effector, according to one embodiment described herein.

FIG. 14 is a flow diagram illustrating a method for refining weights within a machine learning model based on an estimated seal quality metric for holding an item at a candidate contact point using a suction device end effector, according to one embodiment described herein. The method 1400 begins at block 1410, where the model training component 320 determines a robotic control operation and a candidate contact point for holding a first item using a suction device of a robotic picking arm, by processing information describing the first item as an input to a machine learning model. The model training component 320 estimates a seal quality metric for the candidate contact point, based on a predicted deformed three-dimensional shape of the suction device and a three-dimensional shape associated with the first item (block 1420). The model training component 320 then refines one or more weights within the machine learning model based on the estimated seal quality metric (block 1430), and the method 1400 ends.

Figure 15:
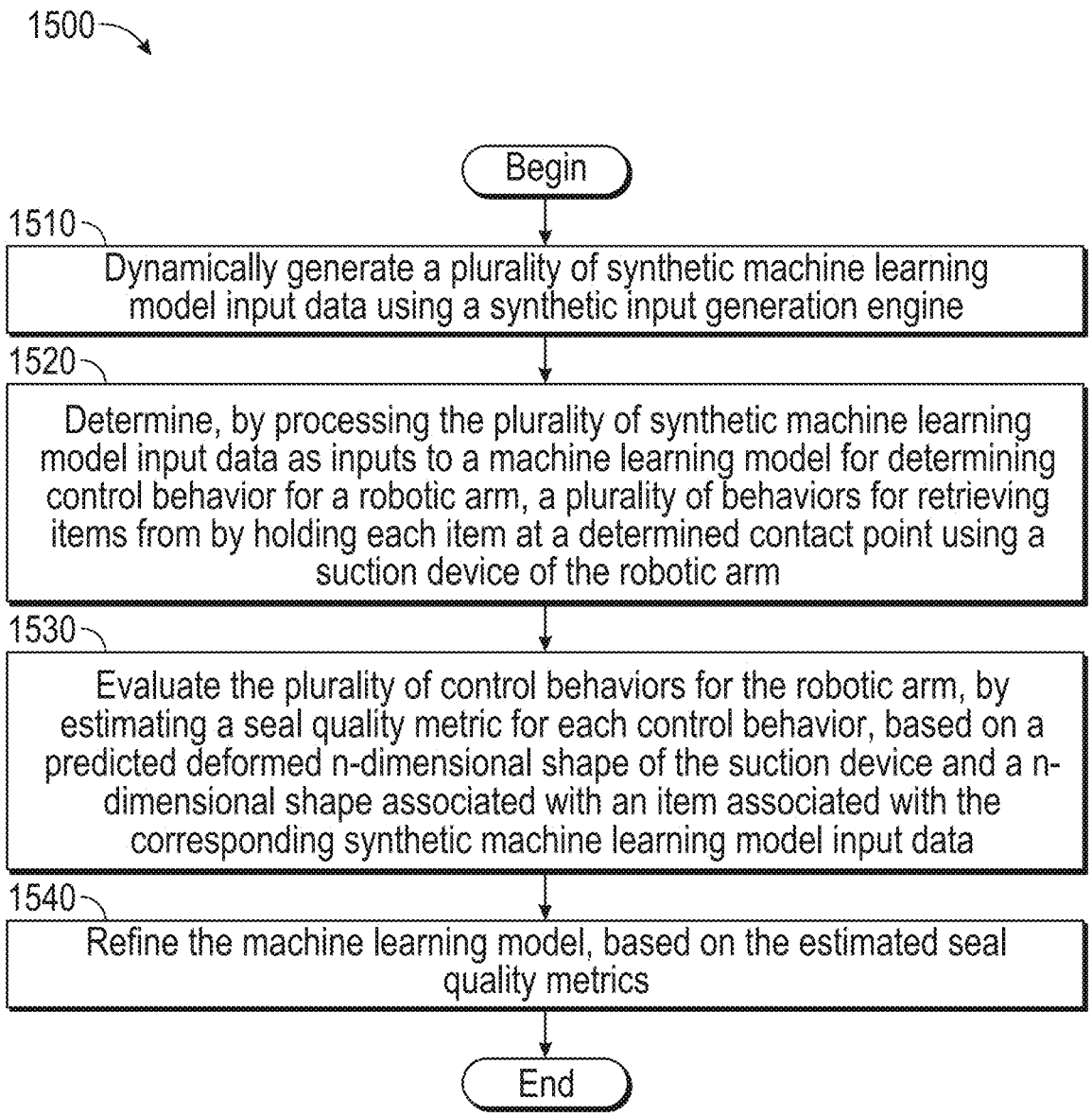
FIG. 15 is a flow diagram illustrating a method for refining a machine learning model based on a plurality of estimated seal quality metrics, according to one embodiment described herein.

FIG. 15 is a flow diagram illustrating a method for refining a machine learning model based on a plurality of estimated seal quality metrics, according to one embodiment described herein. As shown, the method 1500 begins at block 1510, where the synthetic input generation engine 322 dynamically generates a plurality of synthetic machine learning model input data using a synthetic input generation engine. The model training component 320 then determines, by processing the plurality of synthetic machine learning model input data as inputs to a machine learning model for determining control behavior for a robotic arm, a plurality of behaviors for retrieving items from by holding each item at a determined contact point using a suction device of the robotic arm (block 1520). Additionally, the model training component 320 evaluates the plurality of control behaviors for the robotic arm, by estimating a seal quality metric for each control behavior, based on a predicted deformed three-dimensional shape of the suction device and a three-dimensional shape associated with an item associated with the corresponding synthetic machine learning model input data (block 1530). The model training component 320 refines the machine learning model, based on the estimated seal quality metrics (block 1540), and the method 1500 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the model training component 320 could execute on a computing system in the cloud and could receive a machine learning model 347 for refinement. The model training component 320 could dynamically generate a plurality of synthetic machine learning model input data using a synthetic input generation engine and could determine, by processing the plurality of synthetic machine learning model input data as inputs to a machine learning model for determining control behavior for a robotic arm, a plurality of behaviors for retrieving items from by holding each item at a determined contact point using a suction device of the robotic arm. The model training component 320 could then evaluate the plurality of control behaviors for the robotic arm, by estimating a seal quality metric for each control behavior, based on a predicted deformed three-dimensional shape of the suction device and a three-dimensional shape associated with an item associated with the corresponding synthetic machine learning model input data and could refine the machine learning model, based on the estimated seal quality metrics. Doing so enables the machine learning model 347 to be refined in a much more efficient and timely manner.

While the foregoing is directed to embodiments of the present invention, other and further embodiments of the invention may be devised without departing from the basic scope thereof, and the scope thereof is determined by the claims that follow.

What is claimed is:

1. A computer-implemented method performed via execution of one or more computer processors, the computer-implemented method, comprising:
    determining, by at least one of the one or more computer processors processing a first set of inputs using a machine learning model for determining behavior of a robotic arm, a first behavior for retrieving an item from within a storage container by holding the item at a contact point using a suction device of the robotic arm;
    estimating, by at least one of the one or more computer processors, a likelihood of successfully retrieving the item using the determined first behavior, by determining an expected seal quality metric for the contact point, by processing an n-dimensional surface model of the item and physical properties of the suction device of the robotic arm, wherein determining the expected seal quality metric comprises:
        modelling deformation and contact between the suction device and the n-dimensional surface model at the contact point on the item, using at least one n-dimensional spring-lattice to model deformation and contact between the suction device and the n-dimensional surface model at the contact point, such that potential energy across the n-dimensional spring-lattice is minimized; and
        calculating the expected seal quality metric, using the n-dimensional spring-lattice and a fluids model relating fluid force and leak pathways; and
    training, by at least one of the one or more computer processors, the machine learning model to optimize the behavior of the robotic arm, based on the expected seal quality metric.

2. The computer-implemented method of claim 1, wherein training the machine learning model to optimize the behavior of the robotic arm comprises upon determining that the expected seal quality metric does not exceed a predefined threshold level of seal quality, refining one or more weights within the machine learning model to reduce a correlation between the first set of inputs and the first behavior.

3. The computer-implemented method of claim 1, wherein training the machine learning model to optimize the behavior of the robotic arm comprises upon determining that the expected seal quality metric exceeds a predefined threshold level of seal quality, refining one or more weights within the machine learning model to increase a correlation between the first set of inputs and the first behavior.

4. The computer-implemented method of claim 1, further comprising dynamically generating, by at least one of the one or more computer processors, the first set of inputs using a synthetic input generation engine.

5. The computer-implemented method of claim 4, wherein the first set of inputs includes at least one of (i) robotic sensor data, (ii) item metadata, (iii) surface geometry information and (iv) suction device metadata.

6. The computer-implemented method of claim 4, further comprising training, by at least one of the one or more computer processors, the synthetic input generation engine based on a set of historical input data observed within a fulfillment center environment.

7. A system, comprising:
one or more computer processors; and
computer program code that, when executed by operation of the one or more computer processors, performs an operation comprising:
determining a robotic control operation and a candidate contact point for holding a first item using a suction device of a robotic picking arm, by processing information describing the first item as an input to a machine learning model;
estimating a seal quality metric for the candidate contact point, based on a predicted deformed n-dimensional shape of the suction device and a n-dimensional shape associated with the first item; and
refining one or more weights within the machine learning model based on the estimated seal quality metric.

8. The system of claim 7, wherein refining the one or more weights within the machine learning model based on the estimated seal quality metric comprises:
determining whether the estimated seal quality metric satisfies a first predefined criteria by determining whether the estimated seal quality metric exceeds a predefined threshold level of seal quality; and
refining the one or more weights within the machine learning model, based on whether the estimated seal quality metric satisfies the first predefined criteria.

9. The system of claim 7, wherein estimating the seal quality metric for the candidate contact point, based on the predicted deformed n-dimensional shape of the suction device and the n-dimensional shape associated with the first item comprises
generating the predicted deformed n-dimensional shape of the suction device by modelling deformation and contact between the suction device and the n-dimensional shape associated with the first item at the candidate contact point, using at least a first n-dimensional spring-lattice to model deformation and contact between the suction device and the n-dimensional shape associated with the first item at the fir candidate contact point, such that potential energy across the first n-dimensional spring-lattice is minimized.

10. The system of claim 9, wherein estimating the seal quality metric for the candidate contact point, based on the predicted deformed n-dimensional shape of the suction device and the n-dimensional shape associated with the first item further comprises
calculating the seal quality metric, using the first n-dimensional spring-lattice and a fluids model relating fluid force and leak pathways.

11. The system of claim 10, wherein estimating the seal quality metric for the candidate contact point, based on the predicted deformed n-dimensional shape of the suction device and the n-dimensional shape associated with the first item further comprises:
retrieving an item profile corresponding to the first item and specifying data describing physical attributes of the first item; and
generating a second predicted deformed n-dimensional shape for the first item, using at least a second n-dimensional spring-lattice to model deformation and contact between the suction device and the predicted deformed n-dimensional shape for the first item at the candidate contact point, such that potential energy across the first n-dimensional spring-lattice is minimized,
wherein calculating the seal quality metric is further based on the second predicted deformed n-dimensional shape for the first item.

12. The system of claim 7, the operation further comprising:
training a synthetic input generation engine based on a set of historical input data observed within a fulfillment center environment; and
dynamically generating at least one input to the machine learning model using the synthetic input generation engine.

13. The system of claim 7, wherein the information describing the first item comprises a n-dimensional model of the first item and a determined pose of the first item.

14. The system of claim 13, wherein the information describing the first item further comprises metadata describing physical attributes of the first item.

15. A non-transitory computer-readable medium containing computer program code that, when executed by operation of one or more computer processors, performs an operation comprising:
dynamically generating a plurality of synthetic machine learning model input data using a synthetic input generation engine;
determining, by processing the plurality of synthetic machine learning model input data as inputs to a machine learning model for determining control behavior for a robotic arm, a plurality of control behaviors for retrieving items by holding each item at a determined contact point using a suction device of the robotic arm;
evaluating the plurality of control behaviors for the robotic arm, by estimating a seal quality metric for each control behavior, based on a predicted deformed n-dimensional shape of the suction device and a n-dimensional shape associated with an item; and
refining the machine learning model, based on the estimated seal quality metrics.

16. The non-transitory computer-readable medium of claim 15, wherein dynamically generating the plurality of synthetic machine learning model input data using the synthetic input generation engine comprises, for at least one of the plurality of synthetic machine learning model input data:
selecting a first item from a product catalog for a fulfillment center; and retrieving, using a unique identifier corresponding to the first item, an n-dimensional model corresponding to the first item.

17. The non-transitory computer-readable medium of claim 16, wherein dynamically generating the plurality of synthetic machine learning model input data using the synthetic input generation engine further comprises, for the at least one of the plurality of synthetic machine learning model input data:

dynamically generating a pose for the first item using the synthetic input generation engine;

determining a surface geometry for the first item, based on the generated pose and the retrieved n-dimensional model corresponding to the first item; and selecting a candidate contact point on the surface geometry for the first item.

18. The non-transitory computer-readable medium of claim 17, wherein estimating the seal quality metric for each control behavior comprises:

modelling deformation and contact between the suction device and the surface geometry for the first item at the respective candidate contact point, using at least one n-dimensional spring-lattice to model deformation and contact between the suction device and the surface geometry for the first item at the respective candidate contact point; and calculating the seal quality metric, using the n-dimensional spring-lattice and a fluids model relating fluid force and leak pathways.

19. The non-transitory computer-readable medium of claim 18, wherein estimating the seal quality metric for each control behavior further comprises iteratively refining a n-dimensional shape of a first one of the at least one n-dimensional spring-lattice to minimize potential energy across the first n-dimensional spring-lattice, wherein a resulting n-dimensional shape of the first n-dimensional spring-lattice represents the n-dimensional shape of the suction device when suction is applied to the respective candidate contact point of the first item.

20. The non-transitory computer-readable medium of claim 19, wherein estimating the seal quality metric for each control behavior further comprises iteratively refining a second n-dimensional shape of a second one of the at least one n-dimensional spring-lattice to minimize potential energy across the second n-dimensional spring-lattice, wherein a resulting n-dimensional shape of the second n-dimensional spring-lattice represents the n-dimensional shape for the respective candidate contact point on the first item when suction is applied using the suction device.

* * * * *

UNITED STATES PATENT AND TRADEMARK OFFICE
CERTIFICATE OF CORRECTION

| | |
|---|---|
| PATENT NO. | : 10,919,151 B1 |
| APPLICATION NO. | : 15/934568 |
| DATED | : February 16, 2021 |
| INVENTOR(S) | : Andrew D. Marchese et al. |

It is certified that error appears in the above-identified patent and that said Letters Patent is hereby corrected as shown below:

In the Claims

In Column 27, Line 63, in Claim 9, before "candidate" delete "fir".

Signed and Sealed this
Seventh Day of March, 2023

Katherine Kelly Vidal
*Director of the United States Patent and Trademark Office*